United States Patent
Xie et al.

(10) Patent No.: US 11,831,547 B2
(45) Date of Patent: Nov. 28, 2023

(54) BIERV6 PACKET FORWARDING METHOD, DEVICE, AND SYSTEM

(71) Applicant: HUAWEI TECHNOLOGIES CO., LTD., Shenzhen (CN)

(72) Inventors: Jingrong Xie, Beijing (CN); Shuying Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 55 days.

(21) Appl. No.: 17/319,379

(22) Filed: May 13, 2021

(65) Prior Publication Data

US 2021/0377168 A1    Dec. 2, 2021

(30) Foreign Application Priority Data

May 30, 2020 (CN) .......................... 202010480456.8
Aug. 20, 2020 (CN) .......................... 202010841652.3

(51) Int. Cl.
    *G06F 15/16*     (2006.01)
    *H04L 45/74*     (2022.01)
    *H04L 45/00*     (2022.01)

(52) U.S. Cl.
CPC .............. *H04L 45/74* (2013.01); *H04L 45/20* (2013.01)

(58) Field of Classification Search
CPC ......... H04L 45/20; H04L 45/74; H04L 45/04; H04L 45/34; H04L 45/24; H04L 45/28; H04L 45/16; H04L 45/127

(Continued)

(56) References Cited

U.S. PATENT DOCUMENTS

2004/0160941 A1   8/2004   Suh et al.
2006/0067217 A1*   3/2006   Li ........................... H04L 45/00
                                              370/392

(Continued)

FOREIGN PATENT DOCUMENTS

CN         106572016 A     4/2017
JP         2018530969 A    10/2018
WO    WO-2016042505 A2 *   3/2016 ............. H04L 45/16

OTHER PUBLICATIONS

Design and implementation of IPv6 packet forwarding engine for flow based router Yong-Wook Ra;Chang-Ho Choi;Byung-Jun Ahn 2009 11th International Conference on Advanced Communication Technology Year: 2009 | vol. 01 | Conference Paper | Publisher: IEEE (Year: 2009).*

(Continued)

*Primary Examiner* — Oscar A Louie
*Assistant Examiner* — Oluwatosin M Gidado
(74) *Attorney, Agent, or Firm* — Maier & Maier, PLLC

(57) ABSTRACT

A BIERv6 packet forwarding method, device, and system. The method includes: receiving, by a first network device, a BIERv6 packet, where the first network device is a BFR or a BFER; determining, by the first network device, whether a value of a hop limit field in the BIERv6 packet is less than or equal to a preset threshold of the first network device, where the preset threshold is a value greater than or equal to 2, and is determined based on a quantity of one or more consecutive second network devices connected to the first network device, and the second network device is a device that does not support BIER forwarding; and when the value of the hop limit field in the BIERv6 packet is less than or equal to the preset threshold, avoiding, by the first network device, forwarding the BIERv6 packet.

20 Claims, 8 Drawing Sheets

(58) Field of Classification Search
USPC .......................................................... 370/392
See application file for complete search history.

(56) References Cited

U.S. PATENT DOCUMENTS

| | | | | |
|---|---|---|---|---|
| 2015/0078379 | A1* | 3/2015 | Wijnands | H04L 45/74 |
| | | | | 370/390 |
| 2016/0119159 | A1* | 4/2016 | Zhao | H04L 47/15 |
| | | | | 370/390 |
| 2017/0026261 | A1* | 1/2017 | Zehri | H04L 47/17 |
| 2017/0302546 | A1* | 10/2017 | Zheng | H04L 43/0811 |
| 2018/0205636 | A1 | 7/2018 | Hu et al. | |
| 2019/0349069 | A1* | 11/2019 | Gandikota | H04B 7/15557 |

OTHER PUBLICATIONS

Hierarchical Forwarding Bit Index Explicit Replication (HF-BIER) in Multicast Xinting Wu; Xiangyang Gong; Qianlin Wu; Xirong Que; Ye Tian 2019 IEEE 8th Joint International Information Technology and Artificial Intelligence Conference (ITAIC) (Year: 2019).*

Wijnands et al. "Multicast using Bit Index Explicit Replication. draft-ietf-bier-architecture-01." Internet Engineering Task Force. Jun. 25, 2015. XP055550924. 35 pages.

Xie et al. "Encapsulation for BIER in Non-MPLS IPv6 Networks. draft-xie-bier-ipv6-encapsulation-06." Network Working Group. Mar. 9, 2020. 18 pages.

Conta et al. "Internet Control Message Protocol (ICMPv6) for the Internet Protocol Version 6 (IPv6) Specification." Network Working Group, Request for Comments: 4443. Mar. 2006. 24 pages.

Deering et al. "Internet Protocol, Version 6 (IPv6) Specification." Internet Engineering Task Force (IETF), Request for Comments: 8200. Jul. 2017. 42 pages.

Wijnands et al. "Multicast Using Bit Index Explicit Replication (BIER)." Internet Engineering Task Force (IETF), Request for Comments: 8279. Nov. 2017. 43 pages.

Wijnands et al. "Encapsulation for Bit Index Explicit Replication (BIER) in MPLS and Non-MPLS Networks." Internet Engineering Task Force (IETF), Request for Comments: 8296. Jan. 2018. 24 pages.

* cited by examiner

BIERV6 PACKET FORWARDING METHOD, DEVICE, AND SYSTEM

CROSS-REFERENCE TO RELATED APPLICATIONS

This application claims priority to Chinese Patent Application No. 202010841652.3, filed on Aug. 20, 2020, which claims priority to Chinese Patent Application No. 202010480456.8, filed on May 30, 2020. The disclosures of the aforementioned applications are hereby incorporated by reference in their entireties.

TECHNICAL FIELD

The embodiments relate to the field of network communications, and more specifically, to a bit index explicit replication internet protocol version 6 BIERv6 packet forwarding method, a first network device, and a system.

BACKGROUND

In a process of forwarding an internet protocol version 6 (IPv6) packet, if a value of a hop limit field in an outer IPv6 header of the IPv6 packet is less than or equal to 1, the IPv6 packet is not forwarded to a downstream device. Instead, an internet control message protocol version 6 (ICMPv6) error packet is sent to a source address of the outer IPv6 header.

A bit index explicit replication internet protocol version 6 (BIERv6) packet is a combination of a BIER technology and the IPv6 and is based on a one-to-many sending process, and the BIERv6 packet may be a unicast packet. Therefore, if an attacker forges a BIERv6 packet to enable the attacker to receive BIERv6 packets whose values of hop limit fields are less than or equal to 1 on a plurality of nodes in a one-to-many sending process, a source address of an outer IPv6 header receives a plurality of or even a large quantity of ICMPv6 error packets.

Therefore, in a BIERv6 scenario, how to prevent a forwarding network device from generating a plurality of or even a large quantity of ICMPv6 error packets and improve BIERv6 packet forwarding security becomes an urgent problem to be resolved currently.

SUMMARY

The embodiments provide a BIERv6 packet forwarding method, device, and system to avoid a waste of network bandwidth and a waste of bandwidth of an attacked device that are caused by a large quantity of ICMPv6 error packets and improve BIERv6 packet forwarding security.

According to a first aspect, a BIERv6 packet forwarding method is provided. The method includes: a first network device receives a bit index explicit replication internet protocol version 6 BIERv6 packet, where the BIERv6 packet includes a hop limit field, and the first network device is a bit forwarding router BFR or a bit forwarding egress router BFER. The first network device determines whether a value of the hop limit field in the BIERv6 packet is less than or equal to a preset threshold of the first network device, where the preset threshold is a value greater than or equal to 2, the preset threshold is determined based on a quantity of one or more consecutive second network devices connected to the first network device, and the second network device is a device that does not support BIER forwarding. When the value of the hop limit field in the BIERv6 packet is less than or equal to the preset threshold, the first network device avoids forwarding the BIERv6 packet.

It should be understood that the first network device avoiding forwarding the BIERv6 packet may be considered as that the first network device prevents the BIERv6 packet from being sent to a next-hop device or may be considered as that the first network device skips forwarding the BIERv6 packet. In other words, the first network device does not send the BIERv6 packet to the next-hop device of the first network device.

In the foregoing solution, a threshold greater than or equal to 2 may be configured on a device (the first network device) that supports BIERv6 forwarding. Before performing BIER forwarding on the BIERv6 packet, the device that supports BIERv6 forwarding avoids forwarding the BIERv6 packet after checking whether the hop limit in the packet is less than or equal to the threshold. When the BIERv6 packet is sent to a device that does not support BIERv6 forwarding, this can reduce a probability of generating ICMPv6 error packets on the device that does not support BIERv6 forwarding because the value of the hop limit of the BIERv6 packet is 1 or 0. This can improve BIERv6 packet forwarding security and prevent a waste of network bandwidth and a waste of bandwidth of an attacked device that are caused by a large quantity of ICMPv6 error packets.

In a possible implementation, the method further includes: the first network device discards the BIERv6 packet.

In the foregoing solution, to avoid occupying a storage resource, the first network device may further discard the BIERv6 packet.

In another possible implementation, the method further includes: if the first network device is the BFER, the first network device discards the BIERv6 packet when the value of the hop limit field in the BIERv6 packet is equal to the preset threshold, and an inner packet of the BIERv6 packet is not a BIER OAM packet.

In another possible implementation, the method further includes: the first network device avoids forwarding the BIERv6 packet when the value of the hop limit field in the BIERv6 packet is equal to the preset threshold.

In another possible implementation, the method further includes: if the first network device is the BFR, the first network device avoids forwarding the BIERv6 packet when the value of the hop limit field in the BIERv6 packet is equal to the preset threshold; or if the first network device is the BFER, the first network device avoids forwarding the BIERv6 packet when the value of the hop limit field in the BIERv6 packet is equal to the preset threshold.

In another possible implementation, the BIERv6 packet includes a bit string BitString, and the method further includes: when the first network device determines that one bit in the BitString is valid and the bit represents the first network device, the first network device determines that the first network device is the BFER; or when the first network device determines that one bit in the BitString is valid and the bit represents a device other than the first network device, the first network device determines that the first network device is the BFR.

It should be understood that for a packet, a BFER and a BFR may be different network devices or may be a same network device. This is not limited in the embodiments. In other words, the first network device may alternatively serve as a BFER and BFR of a packet.

In another possible implementation, the method further includes: if the first network device is the BFR, the first network device sends the BIERv6 packet to the next-hop device of the first network device when the value of the hop limit field in the BIERv6 packet is greater than the preset threshold; or if the first network device is the BFER, the first network device decapsulates the BIERv6 packet and forwards the decapsulated inner packet when the value of the hop limit field in the BIERv6 packet is greater than the preset threshold.

In another possible implementation, the first network device is a BFR or a BFER in a BIER domain.

According to a second aspect, a first network device is provided. The first network device is a bit forwarding router BFR or a bit forwarding egress router BFER, and the first network device includes:

a receiving module, configured to receive a bit index explicit replication internet protocol version 6 BIERv6 packet, where the BIERv6 packet includes a hop limit field; and a processing module, configured to determine whether a value of the hop limit field in the BIERv6 packet is less than or equal to a preset threshold of the first network device, where the preset threshold is a value greater than or equal to 2, the preset threshold is determined based on a quantity of one or more consecutive second network devices connected to the first network device, and the second network device is a device that does not support BIER forwarding; where the processing module is further configured to avoid forwarding the BIERv6 packet when the value of the hop limit field in the BIERv6 packet is less than or equal to the preset threshold.

In a possible implementation, the processing module is further configured to discard the BIERv6 packet.

In another possible implementation, the processing module is further configured to avoid forwarding the BIERv6 packet when the value of the hop limit field in the BIERv6 packet is equal to the preset threshold.

In another possible implementation, the processing module is further configured to: if the first network device is the BFR, avoid forwarding the BIERv6 packet when the value of the hop limit field in the BIERv6 packet is equal to the preset threshold; or if the first network device is the BFER, avoid forwarding the BIERv6 packet when the value of the hop limit field in the BIERv6 packet is equal to the preset threshold.

In another possible implementation, the BIERv6 packet includes a bit string BitString, and the processing module is further configured to: when one bit in the BitString is valid and the bit represents the first network device, determine that the first network device is the BFER; or when one bit in the BitString is valid and the bit represents a device other than the first network device, determine that the first network device is the BFR.

In another possible implementation, the processing module is further configured to: if the first network device is the BFR, send the BIERv6 packet to a next-hop device of the first network device when the value of the hop limit field in the BIERv6 packet is greater than the preset threshold; or if the first network device is the BFER, decapsulate the BIERv6 packet and forward a decapsulated inner packet when the value of the hop limit field in the BIERv6 packet is greater than the preset threshold.

In another possible implementation, the first network device is a BFR or a BFER in a BIER domain.

Beneficial effects of any one of the second aspect and the possible implementations of the second aspect correspond to beneficial effects of any one of the first aspect and the possible implementations of the first aspect. Details are not described herein again.

According to a third aspect, a first network device is provided. The first network device has a function of implementing an action of the first network device in the foregoing method. The function may be implemented based on hardware or may be implemented based on hardware executing corresponding software. The hardware or software includes one or more modules corresponding to the foregoing function.

In a possible implementation, a structure of the first network device includes a processor and an interface. The processor is configured to support the first network device in performing a corresponding function in the foregoing method. The interface is configured to support the first network device in receiving a BIERv6 packet.

The first network device may further include a memory. The memory is coupled to the processor, and the memory stores a program instruction and data that are necessary for the first network device.

In another possible implementation, the first network device includes a processor, a transmitter, a receiver, a random access memory, a read-only memory, and a bus. The processor is separately coupled to the transmitter, the receiver, the random access memory, and the read-only memory through the bus. When the first network device needs to be run, a bootloader in a basic input/output system or an embedded system that is built into the read-only memory is used to boot a system to start, and boot the first network device to enter a normal running state. After entering the normal running state, the first network device runs an application program and an operating system in the random access memory, so that the processor performs the method in any one of the first aspect or the possible implementations of the first aspect.

According to a fourth aspect, a first network device is provided. The first network device includes a main control board and an interface board and may further include a switching board. The first network device is configured to perform the method in any one of the first aspect or the possible implementations of the first aspect. For example, the first network device includes a module configured to perform the method in any one of the first aspect or the possible implementations of the first aspect.

According to a fifth aspect, a first network device is provided. The first network device includes a control module and a first forwarding sub-device. The first forwarding sub-device includes an interface board and may further include a switching board. The first forwarding sub-device is configured to perform a function of the interface board in the fourth aspect and may further perform a function of the switching board in the fourth aspect. The control module includes a receiver, a processor, a transmitter, a random access memory, a read-only memory, and a bus. The processor is separately coupled to the receiver, the transmitter, the random access memory, and the read-only memory through the bus. When the control module needs to be run, a bootloader in a basic input/output system or an embedded system that is built into the read-only memory is used to boot a system to start, and boot the control module to enter a normal running state. After entering the normal running state, the control module runs an application program and an operating system in the random access memory, so that the control module performs a function of the main control board in the fourth aspect.

It may be understood that, in actual application, the first network device may include any quantity of interfaces, processors, or memories.

According to a sixth aspect, a computer program product is provided. The computer program product includes computer program code, and when the computer program code is run on a computer, the computer is enabled to perform the method according to any one of the first aspect or the possible implementations of the first aspect.

According to a seventh aspect, a computer-readable storage medium is provided. The computer-readable storage medium stores computer program code, and when the computer program code is run on a computer, the computer is enabled to perform the method according to any one of the first aspect or the possible implementations of the first aspect. The computer-readable storage medium includes but is not limited to one or more of the following: a read-only memory (ROM), a programmable ROM (PROM), an erasable PROM (EPROM), a flash memory, an electrically EPROM (EEPROM), and a hard drive.

According to an eighth aspect, a chip is provided. The chip includes a processor and a data interface, and the processor reads, through the data interface, an instruction stored in a memory, to perform the method in any one of the first aspect or the possible implementations of the first aspect. In an implementation process, the chip may be implemented in a form of a central processing unit (CPU), a micro controller unit (MCU), a micro processing unit (MPU), a digital signal processor (DSP), a system on chip (SoC), an application-specific integrated circuit (ASIC), a field programmable gate array (FPGA), or a programmable logic device (PLD).

According to a ninth aspect, a system is provided, and the system includes the foregoing first network device.

DETAILED DESCRIPTION OF THE EMBODIMENTS

Figures 1, 2, 3:
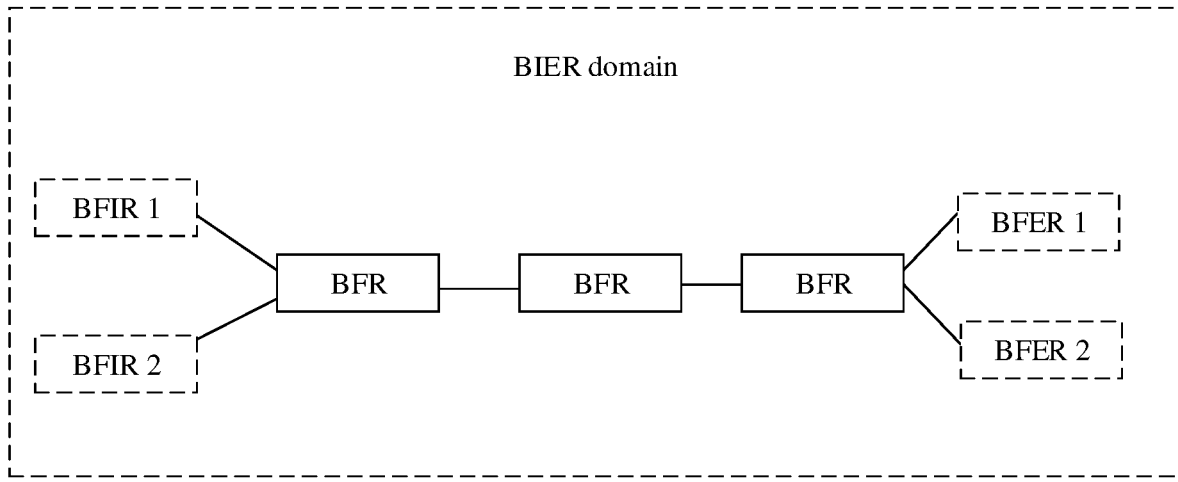
FIG. 1 is a schematic networking diagram of a BIER technology according to an embodiment.
FIG. 2 is a schematic diagram of a possible BIER header format according to an embodiment.
FIG. 3 is a schematic block diagram of another possible BIER header format.

The following describes solutions of the embodiments with reference to accompanying drawings.

All aspects, embodiments, or features are presented in the embodiments by describing a system that includes a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, in the embodiments, the terms such as "example", "such as" are used to represent giving an example, an illustration, or a description. Any embodiment or design scheme described as an "example" should not be explained as being more preferred or having more advantages than another embodiment or design scheme. In other words, "example" is used to present a concept in a specific manner.

In the embodiments, "corresponding (corresponding, related)", and "corresponding (corresponding)" may be interchangeably used at times. It should be noted that meanings expressed by the terms are consistent when differences are not emphasized.

A network architecture and a service scenario described in the embodiments are intended to describe the solutions in the embodiments more clearly, and should not be considered as limiting. A person of ordinary skill in the art may know that, with evolution of the network architecture and emergence of a new service scenario, the solutions provided in the embodiments are also applicable to similar problems.

Reference to "an embodiment", "some embodiments", or the like indicates that one or more embodiments include a feature, structure, or characteristic described with reference to the embodiments. Therefore statements, such as "in an embodiment", "in some embodiments", "in some other embodiments", and "in other embodiments", that appear at different places do not necessarily mean referring to a same embodiment, instead, they mean "one or more but not all of the embodiments", unless otherwise specifically emphasized in other ways. The terms "include", "comprise", "have", and their variants all mean "include but are not limited to", unless otherwise specifically emphasized in other ways.

In the embodiments, "at least one" refers to one or more, and "a plurality of" refers to two or more. The term "and/or" describes an association relationship for describing associated objects and represents that three relationships may exist. For example, A and/or B may represent the following cases: only A exists, both A and B exist, and only B exists, where A and B may be singular or plural. The character "/" generally indicates an "or" relationship between the associated objects. The term "at least one of the following items (pieces)" or an expression similar to the term indicates any combination of the items and includes a single item (piece) or any combination of a plurality of items (pieces). For example, at least one of a, b, or c may indicate: a, b, c; a and b; a and c; b and c; or a, b, and c; where a, b, and c may be singular or plural.

Multicast is a data transmission mode in which data is efficiently sent at a same time to a plurality of receivers on a transmission control protocol (TCP)/internet protocol (IP) network by using a multicast address. A multicast source sends a multicast stream to each of multicast group members in a multicast group through a link in the network, and each multicast group member in the multicast group can receive the multicast stream. A multicast transmission mode implements a point-to-multipoint data connection between the multicast source and the multicast group members. The multicast stream needs to be transmitted only once on each network link, and the multicast stream is replicated only when a branch of the link exists. Therefore, the multicast transmission mode increases data transmission efficiency and reduces a possibility of causing congestion on a backbone network.

An IP multicast technology implements efficient point-to-multipoint data transmission in an IP network, thereby effectively saving network bandwidth and reducing network load. Therefore, the IP multicast technology is widely used in a plurality of aspects such as real-time data transmission, a multimedia conference, data copying, interactive protocol television ( ), a game, and simulation. In the multicast technology, a multicast protocol is used to construct a multicast tree on a control plane, and then the multicast tree is used to perform logical tree shaped forwarding on a network plane, to implement multicast point-to-multipoint data forwarding. An intermediate device with a core of constructing a distribution tree needs to maintain a complex multicast forwarding information state. As a network scale becomes larger and multicast data traffic increases, this multicast technology faces increasingly high costs and operation and maintenance challenges.

Therefore, a new technology for constructing a multicast data forwarding path is put forward in the industry and is referred to as a bit index explicit replication ( ) technology. A multicast technology architecture without constructing a multicast distribution tree is proposed in this technology. As shown in FIG. 1, a router that supports the BIER technology is referred to as a bit forwarding router (BFR). A BFR that performs BIER encapsulation on a user multicast data packet is referred to as a bit forwarding ingress router (BFIR). A BFR that performs decapsulation to obtain the user multicast data packet from a BIER packet is referred to as a bit forwarding egress router (BFER). A multicast forwarding domain formed by one or more BFIRs, one or more BFRs, and one or more BFERs is referred to as a BIER domain. The BFIR is located at an ingress of the BIER domain and is responsible for encapsulating the BIER packet as an ingress node that forwards the BIER packet. The BFR is located in the middle of the BIER domain and is responsible for forwarding the BIER packet as an intermediate node that forwards the BIER packet. The BFER is located at an egress of the BIER domain and is responsible for decapsulating the BIER packet as an egress node that forwards the BIER packet.

It should be understood that the BFIR and the BFER in the BIER domain may also be referred to as edge BFRs in the BIER domain.

Optionally, a device that does not support BIER packet forwarding may also be located in the middle of the BIER domain. The device that does not support BIER packet forwarding may be understood as the device cannot identify or parse a BIER header in the BIER packet, but only forwards the BIER packet as a common packet.

For ease of understanding, the following first describes in detail a BIER-related technology with reference to FIG. 2 to FIG. 5.

In the BIER domain, a globally unique bit position identifier may be configured for the edge BFR in an entire BIER sub-domain (SD). As an example, a value is configured for each edge BFR as a BFR identifier (BFR ID). For example, the BFR ID may be a value ranging from 1 to 256. All BFR IDs in the BIER domain form one bit string (or BitString).

In this embodiment, when the user multicast data packet is transmitted in the BIER domain, a specific BIER header needs to be additionally encapsulated. In the BIER header, the bit string is used to mark all destination devices of the user multicast data packet. The BFR in the BIER domain may perform forwarding based on a bit index forwarding table (BIFT) and the bit string carried in the BIER header, to ensure that the user multicast data packet can be sent to all destination addresses.

It should be understood that the user multicast data packet after the BIER header may be an internet protocol version 6 (IPv6) packet, an internet protocol version 4 (IPv4) packet, or a BIER operation, administration and maintenance (OAM) packet. This is not limited in the embodiments.

There may be a plurality of BIER encapsulation types. This is not limited. As an example, the BIER packet may be encapsulated by using multi-protocol label switching (MPLS), and such encapsulation may be referred to as BIER-MPLS encapsulation. As another example, the BIER packet may be encapsulated based on the internet protocol version 6 (IPv6), and such encapsulation may be referred to as BIERv6 encapsulation.

Figure 4:
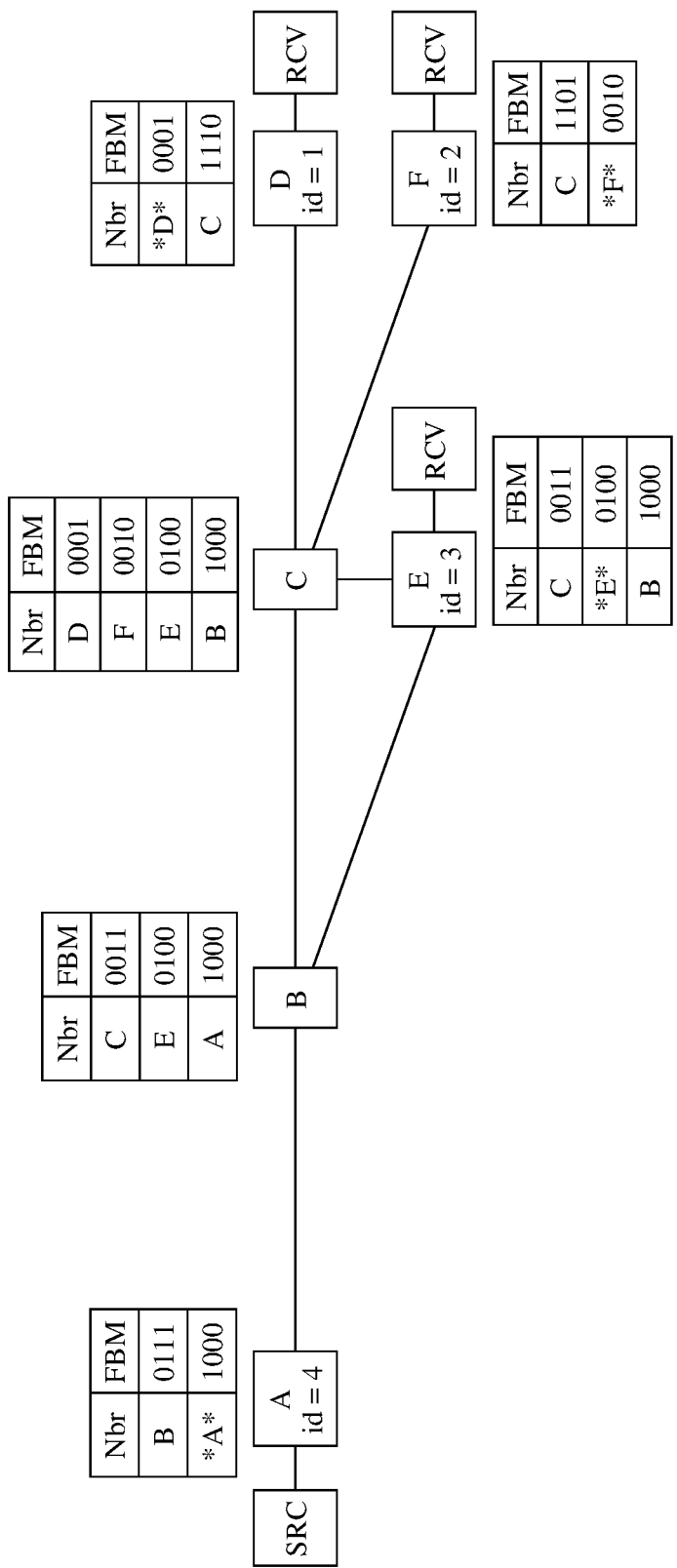
FIG. 4 is a process of creating a BIER forwarding table based on a BIER technology and forwarding a BIER packet.

The following describes in detail a BIER-MPLS encapsulation related technology with reference to FIG. 2 to FIG. 4.

A format of the BIER header is not limited in this embodiment, provided that the BIER header includes the bit string field.

For ease of understanding, the following first describes the format of the BIER header in detail with reference to FIG. 2 and FIG. 3.

FIG. 2 is a schematic block diagram of a possible BIER header format. As shown in FIG. 2, the BIER header may include but is not limited to: a bit index forwarding table identifier (BIFT ID), a bit string length (BSL), and other fields. The other fields may include but are not limited to: a traffic class (TC) field, a stack (S) field, a time to live (TTL) field, an entropy field, a version (Ver) field, a nibble field, a protocol (proto) field, an field, a reserved (Rsv) field, a differentiated services code point (DSCP) field, and the like of the user multicast data packet after the BIER header.

The following describes some fields in the BIER header in detail.

(1) BIFT ID Field

The BIFT ID field may include a combination of a sub-domain (SD)/(BSL/set identifier (SI). Different BIFT IDs may correspond to different combinations of SD/BSL/SI.

It should be understood that different BIFT IDs may be mapped to different combinations of SD/BSL/SI. The BIER header format shown in FIG. 2 does not directly include the SD/BSL/SI field. The SD/BSL/SI represents three implicit fields, and values of the SD/BSL/SI need to be mapped based on the BIFT ID field.

1. Sub-Domain (SD)

One BIER domain may be divided and configured into different sub-domains SDs based on requirements of an actual service scenario, to support features such as an interior gateway protocol (IGP) multi-topology. Each sub-domain SD may be represented by a sub-domain identifier (SD-ID). For example, a value of the SD-ID ranges from 0 to 255, and a length is 8 bits.

2. Bit String Length (BSL)

The BSL is a length of a bit string included in the BIER header. There may be a plurality of BSL types. This is not limited in this embodiment. A minimum length of the BSL is 64 bits, and a length of the BSL may be successively 128 bits, 256 bits, 512 bits, 1024 bits, or 2048 bits. A maximum length of the BSL is 4096 bits. Here, four bits are used for identification in the packet. For example, when the length of the BSL is 64 bits, 0001 is used for identification in the packet; when the length of the BSL is 128 bits, 0010 is used for identification in the packet; when the length of the BSL is 512 bits, 0100 is used for identification in the packet; when the length of the BSL is 1024 bits, 0101 is used for identification in the packet, and so on.

3. Set Identifier (SI)

If a quantity of BFER devices in a network is greater than 256, to adapt to this situation, BIER encapsulation not only includes one BitString, but also includes one SI). The SI is used to divide numbers of the BIER devices into a plurality of different ranges to support larger-scale network addressing.

The SI may be understood as a set including a plurality of edge BFRs or configured BFR IDs in the network. As an example, when the length of the BSL is 256 bits, but there are more than 256 edge BFRs or 256 configured BFR IDs in the network, these edge BFRs or BFR IDs need to be divided into different sets. For example, 256 edge BFRs whose BFR IDs are 1 to 256 are a set 0 (set index 0, or SI=0), and 256 edge BFRs whose BFR IDs are 257 to 512 are a set 1 (set index 1, or SI=1).

After receiving a BIER packet, the BFR in the BIER domain may determine, based on a BIFT ID in a BIER header, a combination including an SD to which the BIER packet belongs, a BSL used in the BIER packet, and an SI of the BSL to which the packet belongs.

It should be noted that a value of the BIFT ID field corresponds to a triplet of <SD, BSL, SI>. The BIFT-id field may be used to obtain unique <SD, BSL, SI> information. The unique <SD, BSL, SI> information has the following functions: the length of the BitString in the BIER packet header is obtained through the BSL, to obtain a length of the entire BIER packet header. It can be understood from the BSL and SI information whether the BitString represents the BFR-ID ranging from 1 to 256 or the BFR-ID ranging from 257 to 512. A corresponding forwarding table may be found based on the SD information.

(2) Bit String Field

Each bit in the bit string is used to identify an edge BFR. For example, a least significant bit (rightmost bit) of the bit string is used to identify a BFER whose BFR-ID is 1. A second bit from right to left in the bit string is used to identify a BFER whose BFR-ID is 2. In a forwarding entry on which a forwarding plane performs forwarding is based, that a packet is to be sent to BFERs is determined based on a bit string in the packet. When the BFR in the BIER domain receives a BIER packet including a BIER packet header, the BFR forwards the BIER packet based on a bit string and a BIFT ID that are carried in the BIER header.

It should be noted that, if a value of the bit is 1, it indicates that the packet needs to be sent to a BFER device represented by the BFR-ID, or if a value of the bit is 0, it indicates that the packet does not need to be sent to a BFER device represented by the BFR-ID.

BIFT ID=2 is used as an example. After receiving the BIER packet, the BFR may determine, based on the BIFT ID in the BIER header, that the BIER packet belongs to an SD 0. A length of the BSL used in the BIER header is 256 bits, and the BIFT ID belongs to the set 1 (including a set of the 256 edge BFRs whose BFR IDs are 257 to 512).

(3) Protocol (Proto) Field

The protocol field is used to identify or distinguish a payload after the BIER packet header. As an example, the proto field may be used to distinguish whether the payload after the BIER packet header is an IPv6 multicast packet, an IPv4 multicast packet, or a BIER OAM packet.

In a possible implementation, a type of the payload may be distinguished by using a value of the proto field in the BIER header. For example, if the value of the proto field is 5 (proto=5), it indicates that the BIER OAM packet follows the BIER packet header; or if the value of the proto field is not 5 (proto!=5), it indicates that the IPv4/IPv6 packet follows the BIER packet header.

FIG. 3 is a schematic block diagram of another possible BIER header format. Compared with the BIER header format shown in FIG. 2, the BIER header format shown in FIG. 3 does not include the BIFT-ID field but includes the three fields: SD/BSL/SI. In other words, the BIER header format shown in FIG. 3 directly includes the three fields: SD/BSL/SI, and the values of the SD/BSL/SI do not need to be mapped from the BIFT ID field.

The following uses FIG. 4 as an example to describe in detail a process of creating a BIER forwarding table based on a BIER technology and forwarding a BIER packet.

A BIER domain shown in FIG. 4 may include a device A to a device F. The device A, the device D, the device E, and the device F are edge BFRs in the BIER domain, and the device B and the device C are intermediate forwarding devices in the BIER domain. In the embodiment, the device A is located at an ingress of the BIER domain and is responsible for performing BIER encapsulation on a user multicast data packet. The device A corresponds to the BFIR in FIG. 1. The device D, the device E, and the device F are located at an egress of the BIER domain and are responsible for performing decapsulation to obtain the user multicast data packet from the BIER packet. Each of the device D, the device E, and the device F corresponds to the BFER in FIG. 1.

In this embodiment, a unique BFR-ID may be allocated to an edge BFR in each BIER domain. For example, in FIG. 4, BFR-IDs configured for the device A, the device D, the device E, and the device F are respectively 4, 1, 3, and 2. BFR-IDs are not allocated to intermediate forwarding BFRs such as the device B and the device C.

It should be noted that in the embodiments, "ID", and "id" may be interchangeably used sometimes. It should be noted that meanings expressed by the terms are consistent when differences are not emphasized. The BFR-ID may refer to the id in FIG. 4.

A bit string encapsulated in a BIER header of data traffic marks all destination devices of the traffic. For example, a bit string corresponding to the device D whose BFR-ID is 1 is 0001, a bit string corresponding to the device F whose BFR-ID is 2 is 0010, a bit string corresponding to the device E whose BFR-ID is 3 is 0100, and a bit string corresponding to the device A whose BFR-ID is 4 is 1000.

It should be understood that the BFR-ID value allocated to the edge BFR in each BIER domain may be flooded to another BFR in the BIER domain according to a routing protocol, and flooded BIER information further includes an IP address and encapsulation information of the edge BFR. For example, flooded BIER information of the device A carries an IP address and an BIFT-id of the device A. A BFR (for example, the device F in FIG. 4) in the BIER domain may create BIFT entries based on the flooded BIER information, so that the device F in FIG. 4 forwards the BIER packet to a destination device based on the created BIFT entries after receiving the BIER packet.

For the device A, if the BIER packet needs to be sent to BFERs whose BFR-IDs are respectively 1, 2, and 3, the BIER packet needs to be first sent to a neighbor (the device B) of the device A, and an edge BFR whose BFR-ID is 4 is the device A. Therefore, BIFT entries created by the device A are shown as follows.

Forwarding entry 1: neighbor (Nbr)=B, and forwarding bit mask (forwarding bit mask, FBM)=0111.

Forwarding entry 2: Nbr*=A, and FBM=1000.

The forwarding entry 1 is used to represent that when any one of the first bit, the second bit, and the third bit from right to left in a bit string in the BIER packet is 1, the BIER packet is sent to the neighbor (the device B) of the device A. Nbr=B represents that the neighbor of the device A is the device B.

The forwarding entry 2 is used to represent that when the fourth bit from right to left in the bit string in the BIER packet is 1, the BIER packet is sent to the device A. The device A is the device A itself, and therefore the device A removes a BIER header, and performs forwarding based on information in the user multicast data packet. It should be noted that in the foregoing forwarding entry 2, * is used to identify that the Nbr is the device itself. For example, for the device A, Nbr*=A represents that a neighboring device of the device A is the device A itself. Similarly, the other devices in FIG. 4 may also create BIFT entries based on neighboring devices of the other devices. For the BIFT entries created by the other devices, refer to FIG. 4. Details are not described herein again.

After receiving the user multicast data packet, the device A used as a BFIR at the ingress of the BIER domain encapsulates the BIER header before the user multicast data packet. It should be understood that, for ease of description, the device A used as the BFIR at the ingress of the BIER domain is hereinafter referred to as an ingress device A for short. As an example, after receiving the user multicast data packet, the ingress device A may learn of a destination device of the user multicast data packet based on user multicast source/group information and correspondence information of a BFR-id that are advertised through a border gateway protocol BGP message. For example, receivers of the user multicast data packet are a destination device E whose BFR-ID is 3, a destination device F whose BFR-ID is 2, and a destination device D whose BFR-ID is 1. The ingress device A encapsulates the bit string in the BIER header into 0111 and forwards an encapsulated BIER packet to the neighboring device B based on the forwarding entry 1. After receiving the BIER packet, the device B determines, based on the bit string being 0111 and the BIFT entries, that the BIER packet needs to be respectively sent to the device C and the device E. When sending the BIER packet to the device C, the device B may perform an AND operation on the bit string (0111) in the BIER header and an FBM field corresponding to Nbr=C in the BIFT entry. In this embodiment, a result of the AND operation is 0011. Therefore, the device B may modify the bit string in the BIER header to 0011 and send bit string (0011) to the device C. Similarly, when sending the BIER packet to the device E, the device B may modify the bit string in the BIER header to 0100. After receiving the BIER packet, the device E determines, based on the bit string being 0100, that the BIER packet is to be sent to the neighboring device E. Because the device E determines that the neighboring device E is the device E itself based on an identifier * in the forwarding table, the device E used as a BFER at the egress of the BIER domain may decapsulate the user multicast data packet from the BIER packet, and forward the user multicast data packet based on information of the inner user multicast data packet.

Figure 5:
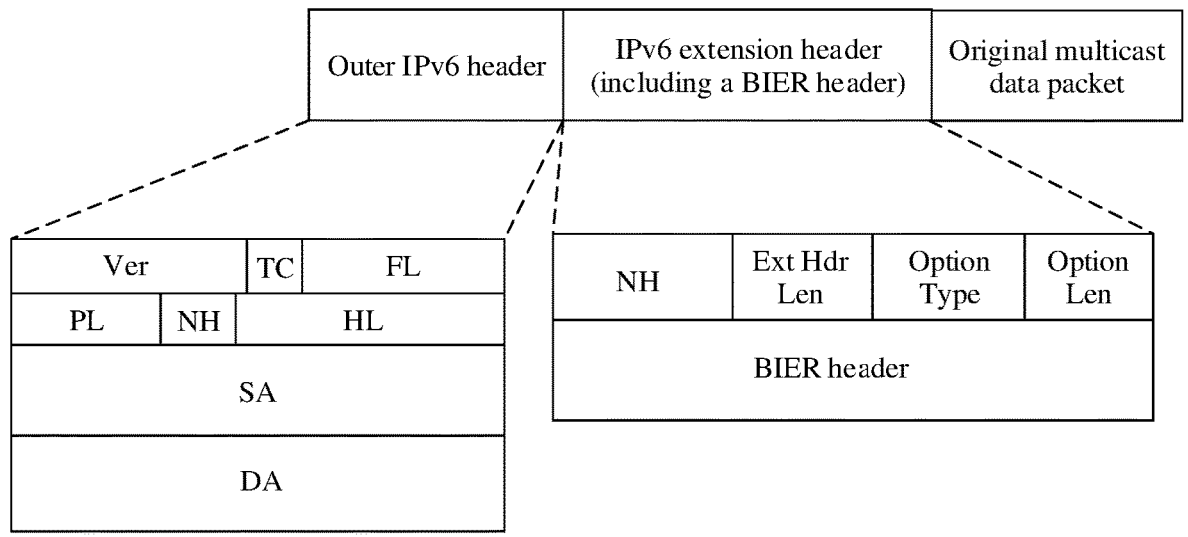
FIG. 5 is a schematic diagram of a possible format of a packet on which BIERv6 encapsulation is performed according to an embodiment.

The following describes in detail a BIERv6 encapsulation related technology with reference to FIG. 5.

FIG. 5 is a schematic block diagram of possible BIERv6 encapsulation. Referring to FIG. 5, a format of an encapsulated IPv6 packet may be: an outer IPv6 header+an IPv6 extension header (including a BIER header)+a user multicast data packet. Under this encapsulation, the outer IPv6 header and the IPv6 extension header including the BIER header jointly form an outer packet header of the IPv6 packet, and the outer packet header may also be referred to as a BIERv6 header in the embodiments.

The IPv6 extension header including the BIER header is not limited in this embodiment. For example, the IPv6 extension header may be a destination options header (destination option header, DOH). For another example, the IPv6 extension header may alternatively be a routing header (routing header, HR).

The following describes some fields in the outer IPv6 header in detail.

A hop limit (HL) field represents a quantity of times that a packet can be effectively forwarded. A hop value decreases by 1 each time the packet passes through a router. When a value of this field is less than or equal to 1, the router does not forward the packet to a downstream device.

A source address (SA) field is used to identify an address of a source node that sends a packet.

A destination address (DA) field is used to identify an address of a destination node that receives the packet.

The DA field is continuously updated to an IP address of a next hop. The BIER domain shown in FIG. 4 is used as an example. The device A is used as an ingress node (ingress device) in an IPv6 network. After receiving the user multicast data packet, the device A encapsulates the packet after the BIERv6 header. In other words, after the outer IPv6 header and the IPv6 extension header including the BIER header, the encapsulated BIERv6 packet is obtained.

The BIER packet header included in the IPv6 extension header carries a bit string representing a set of destination devices. The device A sends the encapsulated BIERv6 packet to the device B based on the BIER packet header and bit string information of the device A. During sending, the destination address field in the IPv6 packet header may use a unicast address of the device B (for example, B::100). The device B sends the packet to the device C and the device E based on the BIER packet header and bit string information of the device B. During sending, the destination address field in the IPv6 header may use a unicast address of the device C (for example, C::100) and a unicast address of the device E (for example, E::100). Similarly, the device C sends the packet to the device D and the device F based on the BIER packet header and bit string information of the device C. During sending, the destination address field in the IPv6 header may use a unicast address of the device D (for example, D::100) and a unicast address of the node F (for example, F::100).

In a process in which an intermediate device (a router or a switch with a router function) in the BIER domain forwards the IPv6 packet, if the value of the hop limit field in the outer IPv6 header of the IPv6 packet is less than or equal to 1, the IPv6 packet is not forwarded to the downstream device, and the intermediate device sends an internet control message protocol version 6 (ICMPv6) error packet to the source address of the outer IPv6 header.

A security threat to IPv6 packet forwarding is that an attacker may forge an IPv6 packet, set a source address of the IPv6 packet to an IPv6 address of an attacked device (for example, a computer host or a router), and set a hop limit field in an IPv6 header to a relatively small value. In this way, when the IPv6 packet is forwarded to each of intermediate devices, these intermediate devices send ICMPv6 error packets to the attacked device (the host or the router) because the value of the hop limit is less than or equal to 1.

A BIERv6 packet is a combination of a BIER technology and the IPv6, and is based on a one-to-many sending process. In addition, the BIERv6 packet may be a unicast packet. Therefore, if a BIERv6 packet is forged, a plurality of intermediate devices may send ICMPv6 error packets to the attacked device. This magnifies an attack effect. If a common IPv6 device that does not support BIERv6 forwarding exists in a network and the device cannot identify or parse a BIERv6 packet header on a control plane and a forwarding plane, it cannot be determined whether a received packet is a common IPv6 packet or a BIERv6 packet. The device sends an ICMPv6 error packet when a value of a hop limit of the packet is less than or equal to 1. A plurality of common IPv6 devices that do not support BIERv6 forwarding further amplify the attack effect.

Figure 6:
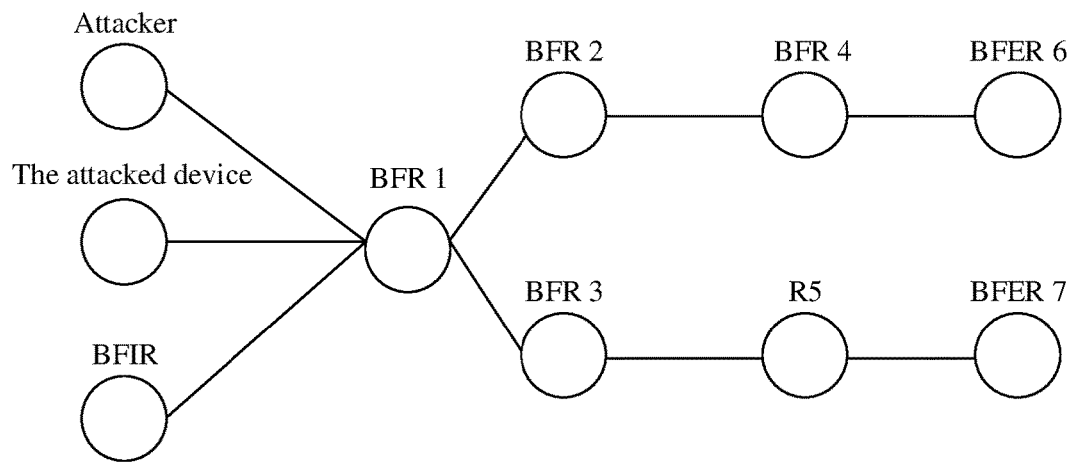
FIG. 6 is a schematic diagram of a BIERv6 forwarding scenario according to an embodiment.

A scenario shown in FIG. 6 is used as an example. Intermediate devices in this scenario may include a device that does not support BIERv6 forwarding. In other words, the intermediate devices include devices (for example, a BFR 2, a BFR 3, and a BFR 4) that supports BIERv6 forwarding and a device (for example, an R5) that does not support BIERv6 forwarding.

It should be understood that the device that supports BIERv6 forwarding (a BFR) means that the device can identify and parse a BIER header in an outer IPv6 header of a BIERv6 packet. The device that supports BIERv6 forwarding (the BFR) actually participates in forwarding the BIERv6 packet. A destination address of the received packet is the device itself when the device participates in forwarding the BIERv6 packet.

It should be further understood that the device that does not support BIERv6 forwarding may be a common IPv6 device that does not support BIERv6 forwarding (a non-BFR), and the device cannot identify and parse the BIER header in the outer IPv6 header of the BIERv6 packet.

It should be noted that the device that does not support BIERv6 forwarding (the non-BFR) does not actually participate in forwarding the BIERv6 packet, and the destination address of the packet received by the device is not the device itself. In addition, there is further a case in which the device that supports BIERv6 forwarding may be used as a non-BFR device. For example, a BIER route is statically configured, and a next hop for forwarding passes through or traverses a device. The non-BFR or the device that does not support BIERv6 forwarding described also includes such a device. Although the device is capable of identifying the BIER header, the destination address of the packet received by the device is not the device itself. Therefore, the BIER header is not used for explicit replication. The non-BFR or the device that does not support BIERv6 forwarding may also send an ICMPv6 error packet when receiving a packet whose hop-limit is less than or equal to 0.

A BFR 1 receives a BIERv6 packet. This BIERv6 packet may be a BIERv6 packet constructed by an attacker (for example, a source address in an outer IPv6 header of the packet is set to an address of the attacked device), or may be sent by a normal router, for example, a BFIR, due to incorrect configuration or incorrect implementation (the source address in the outer IPv6 header of the packet is an address of the BFIR). This is not limited.

If the destination address of the BIERv6 packet received by the BFR 1 is a unicast address and a hop limit in the outer IPv6 header is 3, a BitString in the BIERv6 packet includes valid bits corresponding to a BFER 6 and a BFER 7. In an example, when the packet reaches the BFR 4 along a path BFR 1→BFR 2→BFR 4, the hop limit in the outer IPv6 header of the packet is 1. The BIERv6 packet received by the BFR 4 is a unicast packet. According to a requirement for forwarding the unicast packet, the BFR 4 does not forward the packet, but the BFR 4 sends an ICMPv6 error packet, where the ICMPv6 error packet is sent to the source address of the packet (the attacked device or the BFIR). In another example, when the packet reaches the BFR 3 along a path BFR 1→BFR 3, the hop limit in the outer IPv6 header of the packet is 2, and the BFR 3 sends the packet along a path BFR 3→R5→BFER 7. The destination address of the packet is the BFER 7, but the packet passes through the R5. The R5 cannot determine whether the received packet is a common IPv6 packet or a BIERv6 packet and considers the packet as a unicast packet. According to the requirement for forwarding the unicast packet, the R5 does not forward the packet, but sends an ICMPv6 error packet, where the ICMPv6 error packet is sent to the source address of the packet (the attacked device or the BFIR).

Therefore, in a BIERv6 scenario, how to prevent a network device that forwards a BIERv6 packet from generating a large quantity of ICMPv6 error packets and improve packet forwarding security becomes an urgent problem to be resolved currently.

In a related solution, in the BIERv6 scenario, to prevent from generating the large quantity of ICMPv6 error packets, each BFR device is required to implement rate limiting on the ICMPv6 error packet, and discard a packet that exceeds a rate limit, to prevent a plurality of intermediate devices from sending a large quantity of ICMPv6 error packets to a same ingress node (ingress device).

In the foregoing related solution, if the attacker constructs a BIERv6 packet with a specific value of a hop limit, an intermediate device may receive a packet whose hop limit value is 1 or 0 and send an ICMPv6 error packet to the attacked device. The attacked device may be attacked because the attacked device is a device that does not implement ICMPv6 rate limiting. Even if the attacked is a device that implements ICMPv6 rate limiting, this ICMPv6 error packet still wastes network bandwidth and bandwidth of an attacked device.

In view of this, an embodiment provides a BIERv6 packet forwarding method. A threshold greater than or equal to 2 may be configured on a device that supports BIERv6 forwarding. Before performing BIER forwarding on the BIERv6 packet, the device that supports BIERv6 forwarding avoids forwarding the BIERv6 packet after checking whether a hop limit in the packet is less than or equal to the threshold. When the BIERv6 packet is sent to a device that does not support BIERv6 forwarding, this can reduce a probability of generating ICMPv6 error packets on the device that does not support BIERv6 forwarding because the value of the hop limit of the BIERv6 packet is 1 or 0. This can improve BIERv6 packet forwarding security and prevent a waste of network bandwidth and a waste of bandwidth of an attacked device that are caused by a large quantity of ICMPv6 error packets.

It should be understood that, in this embodiment, avoiding forwarding the BIERv6 packet may be considered as preventing the BIERv6 packet from being sent to a next-hop device, or may be considered as skipping forwarding the BIERv6 packet. In other words, avoiding forwarding the BIERv6 packet may be understood as not sending the BIERv6 packet to the next-hop device.

It should be noted that hop limit thresholds may be respectively configured on one or more or all BIERv6 routers in a network. As an example, a network administrator may separately configure the hop limit thresholds of the one or more or all BIERv6 routers. These thresholds may be the same or different. This is not limited in this embodiment.

Figure 8:
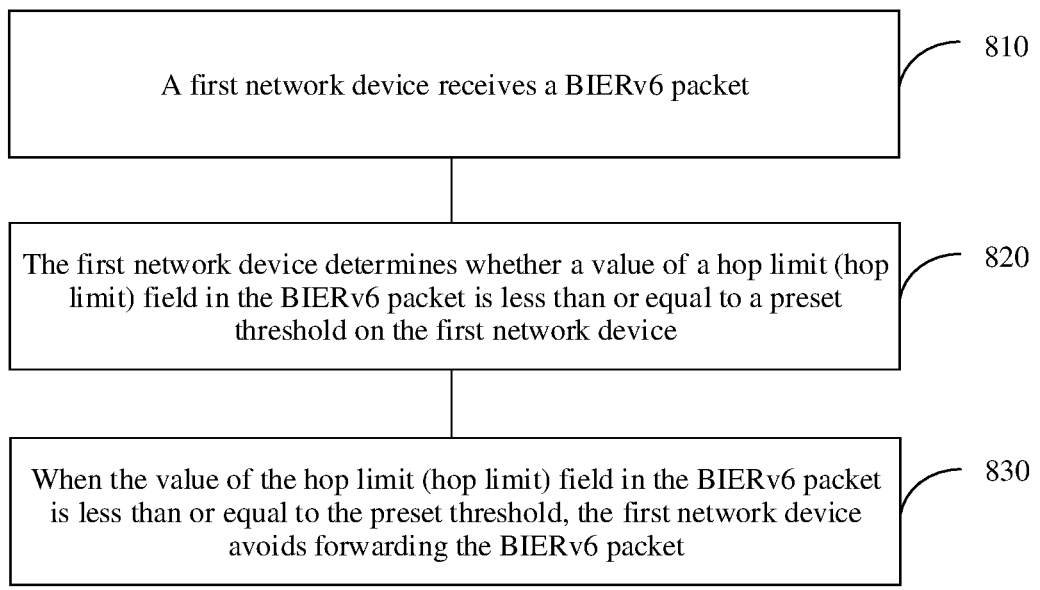
FIG. 8 is a schematic flowchart of a BIERv6 packet forwarding method according to an embodiment.

The following describes in detail a BIERv6 packet forwarding method according to an embodiment with reference to FIG. 8.

FIG. 8 is a schematic flowchart of a BIERv6 packet forwarding method according to an embodiment. As shown in FIG. 8, the method may include steps 810 to 830. The following separately describes the steps 810 to 830 in detail.

Step 810: A first network device receives a BIERv6 packet.

The first network device in this embodiment may be the BFR or the BFER shown in FIG. 1. As an example, the first network device may be a BFR or a BFER in a BIER domain. For specific descriptions of the BIER domain and the BFR or the BFER, refer to the descriptions in FIG. 1. Details are not described herein again.

Step 820: The first network device determines whether a value of a hop limit field in the BIERv6 packet is less than or equal to a preset threshold of the first network device.

The preset threshold configured on the first network device is a value greater than or equal to 2. The preset threshold may be determined based on a quantity of one or more consecutive second network devices connected to the first network device, and the second network device is a device that does not support BIER forwarding. It should be understood that the preset threshold may also be referred to as a hop limit threshold.

As an example, the hop limit threshold may be configured on the first network device that supports BIER forwarding, and a value of the threshold is not less than 1 plus a quantity of consecutive devices that do not support BIER forwarding. The following describes in detail an implementation method for determining the preset threshold configured on the first network device.

The scenario shown in FIG. 6 is used as an example. The R5 is a device that does not support BIER forwarding. Both the BFR 3 and the BFER 7 are connected to the device (the R5) that does not support BIER forwarding, and a quantity of devices connected to the BFR 3 and the BFER 7 and not supporting BIER forwarding is 1. Therefore, preset thresholds of the BFR 3 and the BFER 7 may be set to values not less than 2.

Figure 7:
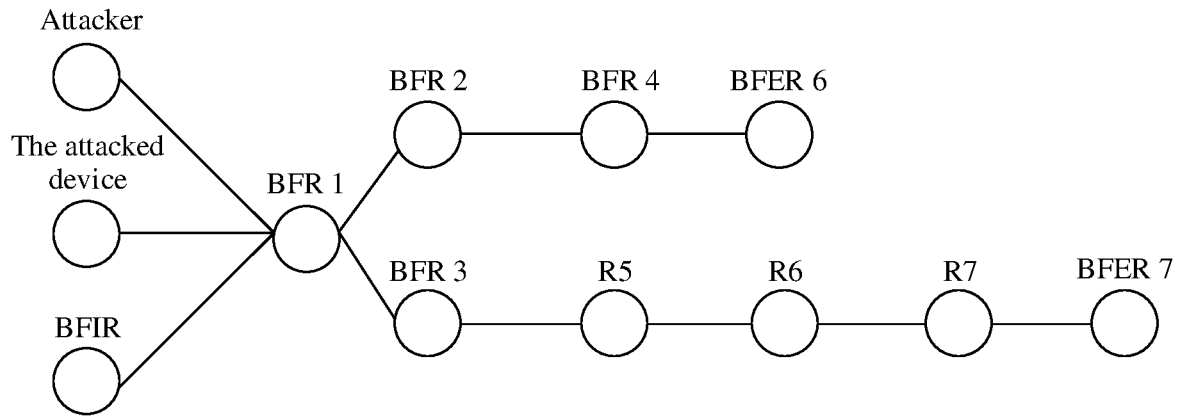
FIG. 7 is a schematic diagram of another BIERv6 forwarding scenario according to an embodiment.

A scenario shown in FIG. 7 is used as an example. An R5, an R6, and an R7 are all devices that do not support BIER forwarding. Both a BFR 3 and a BFER 7 are connected to the devices (the R5, the R6, and the R7) that do not support BIER forwarding, and a quantity of devices connected to the BFR 3 and the BFER 7 and not supporting BIER forwarding is 3. Therefore, preset thresholds of the BFR 3 and the BFER 7 may be set to values not less than 4.

Step 830: When the value of the hop limit field in the BIERv6 packet is less than or equal to the preset threshold, the first network device avoids forwarding the BIERv6 packet.

It should be understood that a situation where the first network device avoids forwarding the BIERv6 packet may be considered as that the first network device prevents the BIERv6 packet from being sent to a next-hop device or may be considered as that the first network device skips forwarding the BIERv6 packet. In other words, the first network device does not send the BIERv6 packet to the next-hop device of the first network device.

In the foregoing solution, a threshold greater than or equal to 2 may be configured on a device (the first network device) that supports BIERv6 forwarding. Before performing BIERv6 forwarding on the BIERv6 packet, the device that supports BIERv6 forwarding avoids forwarding the BIERv6 packet after checking whether the hop limit in the packet is less than or equal to the threshold. When the BIERv6 packet is sent to a device that does not support BIERv6 forwarding, this can reduce a probability of generating ICMPv6 error packets on the device that does not support BIERv6 forwarding because the value of the hop limit of the BIERv6 packet is 1 or 0. This can improve BIERv6 packet forwarding security and prevent a waste of network bandwidth and a waste of bandwidth of an attacked device that are caused by a large quantity of ICMPv6 error packets.

Optionally, in some embodiments, after the first network device avoids forwarding the BIERv6 packet, the first network device may further discard the BIERv6 packet.

Optionally, in some embodiments, the first network device determines that the value of the hop limit field in the BIERv6 packet is not less than the preset threshold of the first network device. The following describes in detail a process in which the first network device processes the BIERv6 packet for this case.

In an example, the value of the hop limit field in the BIERv6 packet is equal to the preset threshold. In a possible implementation, regardless of whether the first network device is the BFR or the BFER, the first network device avoids forwarding the BIERv6 packet. In another possible implementation, when the first network device determines that the first network device is the BFR, the first network device avoids forwarding the BIERv6 packet. Alternatively, when the first network device determines that the first network device is the BFER, the first network device decapsulates the BIERv6 packet, and forwards a decapsulated inner packet.

In another example, the value of the hop limit field in the BIERv6 packet is greater than the preset threshold. For example, the first network device is the BFR, and the first network device sends the BIERv6 packet to the next-hop device of the first network device. For another example, the first network device is the BFER, and the first network device decapsulates the BIERv6 packet, and forwards a decapsulated inner packet.

Figure 9:
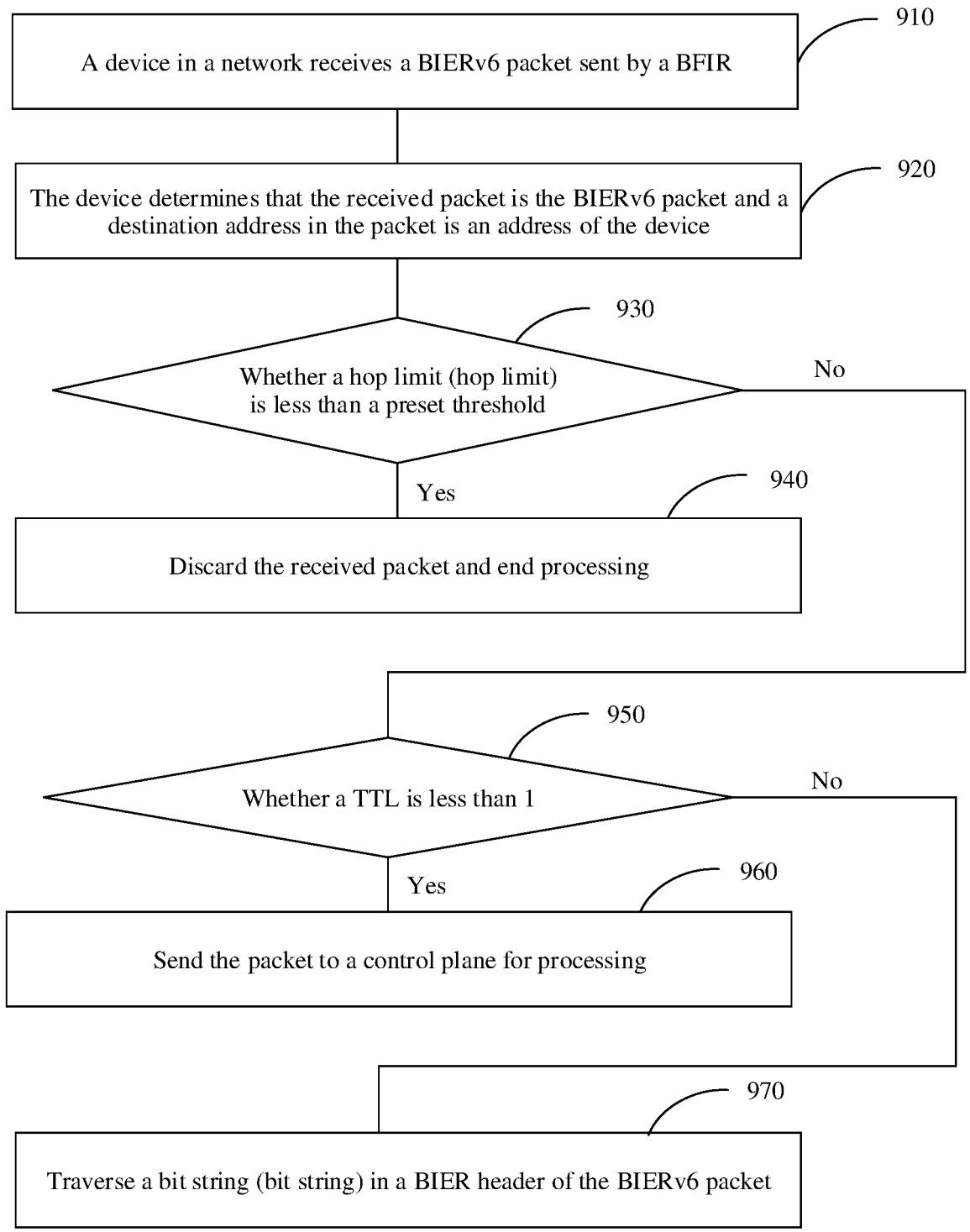
FIG. 9 is a schematic flowchart of another BIERv6 packet forwarding method according to an embodiment.

The following uses the scenario shown in FIG. 6 as an example to describe in detail another implementation process in which the device in this embodiment forwards the BIERv6 packet with reference to FIG. 9.

It should be noted that examples in FIG. 9 are merely intended to help a person of ordinary skill in the art understand the embodiments, instead of limiting the embodiments to a specific value or a scenario shown in the examples. A person of ordinary skill in the art can make various equivalent modifications or changes according to the examples shown in FIG. 9, and such modifications or changes also fall within the scope of the embodiments.

FIG. 9 is a schematic flowchart of another BIERv6 packet forwarding method according to an embodiment. As shown in FIG. 9, the method may include steps 910 to 970. The following separately describes the steps 910 to 970 in detail.

Step 910: A device in a network receives a BIERv6 packet sent by a BFIR.

The BFIR can perform BIERv6 encapsulation on a received user multicast data packet, to obtain the BIERv6 packet, and send the BIERv6 packet to the device in the network. The BIERv6 packet may carry an outer IPv6 header, an IPv6 extension header (the extension header carries a BIER header), and a payload, where the payload may be an inner IPv4/IPv6 multicast data packet or an inner BIER OAM packet.

The IPv4/IPv6 multicast data packet or the BIER OAM packet may be distinguished by a value of a proto field in the BIER header. For example, if the value of the proto field is 5 (proto=5), it indicates that the BIER OAM packet follows the BIER packet header; or if the value of the proto field is not 5 (proto!=5), it indicates that the IPv4/IPv6 packet follows the BIER packet header. For details, refer to the descriptions in FIG. 2, and details are not described herein again.

It should be noted that the device in the foregoing network is a BIERv6 router. As an example, the device may be a BFR (for example, the BFR 2, the BFR 3, or the BFR 4 in FIG. 6) in a BIER domain, or may be a BFER (for example, the BFER 6 or the BFER 7 in FIG. 6). This is not limited in the embodiments.

Step 920: The device determines that the received packet is the BIERv6 packet and a destination address in the packet is an address of the device.

After receiving the packet, the device may perform a forward information database (forward information database, FIB) lookup on the destination address of the received packet, to learn that the destination address of the packet is the address of the device.

There are a plurality of implementations in which the device determines that the received packet is the BIERv6 packet. In a possible implementation, the device learns that the destination address of the packet is the address of the device, and may learn of indication information indicating that the destination address is an address of an endpoint for bit index explicit replication (endpoint for bit index explicit replication, End.BIER). Therefore, it may be determined that the received packet is the BIERv6 packet. In another possible implementation, whether the IPv6 extension header includes the BIER header may further be determined based on the indication information. If the IPv6 extension header includes the BIER header, it may be determined that the received packet is the BIERv6 packet. In another possible implementation, whether the IPv6 extension header includes the BIER header may not be directly checked based on the indication information. If the IPv6 extension header includes the BIER header, it may be determined that the received packet is the BIERv6 packet.

Step 930: The device checks whether a hop limit in the outer IPv6 header is less than a preset threshold.

If the hop limit in the outer IPv6 header is less than the preset threshold, step 940 may be performed.

If the hop limit in the outer IPv6 header is greater than or equal to the preset threshold, step 950 may be performed.

It should be understood that, in this embodiment, preset thresholds set on devices may be the same or may be different. The preset threshold may be configured or may be a default value. As an example, on the BFR device, the preset threshold may be 2 by default, and on the BFER device, the preset threshold may be 1 by default.

Step 940: The device discards the received packet and ends processing.

Step 950: The device determines whether a value of a TTL field in the BIER header of the packet is less than 1.

If the value of the TTL field in the BIER header is less than 1, for example, the value of the TTL field is 0, step 960 is performed.

If the value of the TTL field in the BIER header is greater than or equal to 1, step 970 is performed.

Step 960: The device sends the packet to a control plane for processing.

It should be understood that a router or a switch usually has a "forwarding plane" and a "control plane". A forwarding plane process is a process in which a packet is received from an interface of a router and sent to one or more interfaces. The forwarding plane process is usually implemented by a dedicated forwarding chip or a combination of chips. The "control plane" includes a "general-purpose CPU" chip or a chip set. When the forwarding plane finds that the value of the TTL field of the packet is less than 1, the forwarding plane may send the packet to the control plane for processing.

As an example, the control plane may determine a type of the packet and perform different processing. For example, the control plane may determine the type of the packet by using the proto field in the BIER header, and perform corresponding processing based on the type of the packet. The following describes several possible implementations in detail.

In a possible implementation, if the packet is not the BIER OAM packet, or if it is determined that the packet is a multicast data packet, the packet is discarded, and processing ends.

In another possible implementation, if the packet is the BIER OAM packet, the packet is subsequently processed by the control plane, and a processing mode of the packet may be processing performed according to a BIER OAM protocol. For example, whether the BIER OAM packet is an echo request packet is checked. If the BIER OAM packet is the echo request packet, an echo reply of the BIER OAM packet is correspondingly sent to a source address in the outer IPv6 header of the packet.

Step 970: The device traverses a BitString in the BIER header of the BIERv6 packet.

It should be understood that, in this embodiment, when the hop limit is greater than or equal to the preset threshold or the value of the TTL field is greater than or equal to 1, whether the device is the BFR or the BFER further needs to be determined.

As an example, the device may traverse the BitString in the BIER header of the BIERv6 packet. When a bit traversed in the BitString in the BIER header is valid (for example, a value of the bit is 1) and the bit represents the current node, the device may determine that the device is the BFER.

In another example, if a bit traversed in the BitString in the BIER header is valid (for example, a value of the bit is 1), and the bit represents another node other than the current node, the device may determine that the device is the BFR.

The following uses an example in which the device is the BFER for detailed description.

For the BIERv6 packet whose hop limit in the outer IPv6 header is greater than or equal to the preset threshold, or the BIERv6 packet whose value of the TTL field in the BIER header is greater than or equal to 1, a type of an inner data packet of the BIERv6 packet may further be determined. For example, the device may determine the type of the packet on a data plane. For example, the device may determine the type of the packet by using the proto field in the BIER header. For specific determining, refer to the foregoing descriptions. Details are not described herein again.

In a possible implementation, if the packet is not the BIER OAM packet, the outer IPv6 header and the IPv6 extension header are popped out, and subsequent forwarding is performed based on an inner multicast data packet. It should be understood when the BIERv6 packet whose hop limit is equal to the threshold is forwarded, the BFER may work in a "pipe" mode. In this "pipe" mode, the value of the hop limit in the outer IPv6 header is not duplicated to a hop limit field in an inner IPv6 user multicast packet or a TTL field in an inner IPv4 multicast packet and is further decreased by one.

In another possible implementation, if the packet is not the BIER OAM packet and the hop limit in the outer IPv6 header is greater than the preset threshold, the outer IPv6 header and the IPv6 extension header are popped out. If the packet is not the BIER OAM packet and the hop limit in the outer IPv6 header is equal to the preset threshold, the received packet is discarded, and processing ends. This case in which the BIERv6 packet whose hop limit is equal to the threshold is discarded may be a case in which the BFER node works in a "uniform" mode. In this "uniform" mode, the value of the hop limit in the outer IPv6 header is duplicated to a hop limit field in an inner IPv6 user multicast packet or a TTL field in an inner IPv4 multicast packet and is further decreased by one.

In another possible implementation, if the packet is the BIER OAM packet, the packet is subsequently processed by the control plane, and the processing mode of the packet may be processing performed according to the BIER OAM protocol. For example, whether the BIER OAM packet is the echo request packet is checked. If the BIER OAM packet is the echo request packet, the echo reply of the BIER OAM packet is correspondingly sent to the source address in the outer IPv6 header of the packet.

The following uses an example in which the device is the BFR for detailed description.

When the device is the BFR, the device can obtain information about a next hop to another node, for example, an outbound interface or a MAC address of the next hop. For the BIERv6 packet whose hop limit is greater than the preset threshold or the BIERv6 packet whose value of the TTL field is greater than 1, the device may make a duplicate of the BIERv6 packet, subtract 1 from the value of the hop limit of the outer IPv6 header of the duplicated BIERv6 packet, and subtract 1 from the TTL value of the BIER header, and send the duplicated BIERv6 packet to the next hop based on the obtained information about the next hop to the another node.

If the hop limit in the BIERv6 packet is equal to the preset threshold, the device may discard the BIERv6 packet and end processing.

For the BIERv6 packet whose value of the TTL field is equal to 1, the type of the packet may be determined and different processing may be performed. For example, the type of the packet may be determined by using the proto field of the BIER header, and corresponding processing is performed based on the type of the packet. In a possible implementation, if the packet is not the BIER OAM packet, or if it is determined that the packet is a multicast data packet, the packet is discarded, and processing ends. In another possible implementation, if the packet is the BIER OAM packet, the packet is subsequently processed by the control plane, and the processing mode of the packet may be processing performed according to the BIER OAM protocol. For example, whether the BIER OAM packet is the echo request packet is checked. If the BIER OAM packet is the echo request packet, an echo reply of the BIER OAM packet is correspondingly sent to the source address in the outer IPv6 header of the packet.

The following uses the scenario shown in FIG. 6 as an example to describe how the BIERv6 router (for example, the BFR or the BFER) in the network processes the packet according to the method shown in FIG. 9 by using an example in which the inner data packet of the BIERv6 packet is the IPv4/IPv6 packet. It should be understood that, in the following embodiment, it is assumed that the hop limit threshold of the BFR is 2, and the hop limit threshold of the BFER is 1.

In an example, when the BFR 3 receives a multicast data packet encapsulated in the BIERv6 packet, the value of the hop limit in the outer IPv6 header is 2, the TTL value in the BIER header is 1, and the BitString includes the BFER 7 node. A processing result is that the BFR 3 discards the packet.

In another example, when the BFR 3 receives a multicast data packet encapsulated in the BIERv6, the value of the hop limit in the outer IPv6 header is 3, the TTL value in the BIER header is 1, and the BitString includes the BFER 7 node. A processing result is that the BFR 3 forwards the BIERv6 packet to the R5. The destination address in the outer IPv6 header of the BIERv6 packet is an IP address of the BFER 7, the hop limit in the outer IPv6 header is 2, and the TTL in the BIER header is 0. After receiving the BIERv6 packet, the R5 forwards the BIERv6 packet to the BFER 7. The destination address of the BIERv6 packet is the IP address of the BFER 7, the hop limit is 1, and the TTL is 0. After receiving the BIERv6 packet, the BFER 7 discards the packet according to the foregoing packet forwarding method and ends processing.

In another example, when the BFR 3 receives a multicast data packet encapsulated in the BIERv6, the value of the hop limit is 3, the TTL value is 2, and the BitString includes the BFER 7 node. A processing result is that the BFR 3 forwards the BIERv6 packet to the R5. The destination address of the BIERv6 packet is an IP address of the BFER 7, the hop limit is 2, and the TTL is 1. After receiving the packet, the R5 forwards the packet to the BFER 7. The destination address of the BIERv6 packet is the IP address of the BFER 7, the hop limit is 1, and the TTL is 1. After receiving the BIERv6 packet, the BFER 7 decapsulates the BIERv6 header according to the foregoing packet forwarding method and forwards the BIERv6 packet based on the inner multicast data packet.

Therefore, if a relatively large hop limit value and a relatively large TTL value are normally used, a data packet can be normally forwarded to an egress node (for example, the BFER 7) and be forwarded. However, if a relatively small hop limit value is used, the packet may be discarded on the BFR 3. This prevents the packet from being sent to the R5 and avoids an attack risk caused by generated ICMPv6 error packets when hop limit=1. If the TTL value is improper, the packet cannot reach a final BFER or cannot be normally forwarded on the BFER.

Therefore, when BIERv6 encapsulation is performed on a normal multicast data packet and an encapsulated BIERv6 packet is sent, a proper hop limit value and a proper TTL value can be selected. For example, in a network topology shown in FIG. 6, it may be selected that both the hop limit and the TTL are 32, so that the data packet can be normally forwarded to the BFER and be forwarded. However, for a BIERv6 packet whose hop limit is 3 and TTL is 3 and that is specially constructed by a network attacker in FIG. 6, according to this method, the BIERv6 packet can be discarded before the BIERv6 packet reaches the R5. This avoids an attack caused by ICMPv6 error packets generated on the R5 when the packet is sent to the R5.

The following uses the scenario shown in FIG. 6 as an example to describe how the BIERv6 router (for example, the BFR or the BFER) in the network processes the packet according to the method shown in FIG. 9 by using an example in which the inner data packet of the BIERv6 packet is the BIER OAM packet. It should be understood that, in the following embodiment, it is assumed that the hop limit threshold of the BFR is 2, and the hop limit threshold of the BFER is 1.

In a possible implementation, a BIER trace detection is used as an example. It is assumed that BIER packets whose TTL=1/2/3 are sequentially sent from the BFIR, and each packet uses hop limit=127. A processing process is as follows.

In an example, for the first OAM packet, the packet sent by the BFIR carries TTL=1 and hop limit=127. After receiving the packet, the BFR 1 sends the packet to the control plane, and the control plane sends an echo reply OAM packet.

In another example, for the second OAM packet, the packet sent by the BFIR carries TTL=2 and hop limit=127. After receiving the packet, the BFR 1 forwards the packet to the BFR 3. The TTL of the packet received by the BFR 3 is 1, and the hop limit of the packet received by the BFR 3 is 126. After receiving the packet, the BFR 3 sends the packet to the control plane, and the control plane sends an echo reply OAM packet.

In another example, for the third OAM packet, the packet sent by the BFIR carries TTL=3 and hop limit=127. After receiving the packet, the BFR 1 forwards the packet to the BFR 3. The TTL of the packet received by BFR 3 is 2, and the hop limit of the packet received by BFR 3 is 126. After receiving the packet, the BFR 3 sends the packet to the R5. The TTL of the packet received by the R5 is 1, and the hop limit of the packet received by the R5 is 125. After receiving the packet, the R5 sends the packet to the BFER 7, where the TTL of the packet received by the BFER 7 is 1, and the hop limit of the packet received by the BFER 7 is 124. The BFER 7 sends the packet to the control plane, and the control plane sends an echo reply OAM packet.

The BIER trace detection is used to perform hop-by-hop detection on each device in the network. It can be understood that a relatively large hop limit value is used during the BIER trace detection, and each BFR/BFER can be detected.

In another possible implementation, a BIER trace detection is used as an example. It is assumed that BIER packets whose TTL=1/2/3 are sequentially sent from the BFIR, and each packet uses hop limit=3. A processing process is as follows.

In an example, for the first OAM packet, the packet sent by the BFIR carries TTL=1 and hop limit=3. After receiving the packet, the BFR 1 sends the packet to the control plane, and the control plane sends an echo reply OAM packet.

In another example, for the second OAM packet, the packet sent by the BFIR carries TTL=2 and hop limit=3. After receiving the packet, the BFR 1 forwards the packet to the BFR 3. The TTL of the packet received by BFR 3 is 1, and the hop limit of the packet received by BFR 3 is 2. After receiving the packet, the BFR 3 discards the packet and does not send an echo reply packet.

In another example, for the third OAM packet, the packet sent by the BFIR carries TTL=3 and hop limit=3. After the BFR 1 receives the packet, the BFR 1 forwards the packet to the BFR 3. The TTL of the packet received by the BFR 3 is 2 and the hop limit of the packet received by the BFR 3 is 2. After receiving the packet, the BFR 3 discards the packet and does not send an echo reply packet.

It can be understood that a relatively small hop limit value is used during the BIER trace detection, and some BFRs/BFERs cannot be detected.

Therefore, a proper hop limit value may be selected during the BIER trace detection, so that each BFR/BFER can be detected.

In some embodiments, that the hop limit threshold is 2 is used as an example. When the value of the hop limit is equal to the threshold, or the value of the TTL field is equal to 1, a processing mode of the BFER is different from a processing mode of the BFR. Therefore, the value of the hop limit or the value of TTL field is determined once when the BIERv6 packet is received. After the BitString is traversed, the value of the hop limit or the value of TTL field needs to be determined again. To avoid the preceding situation, the hop limit and TTL are not determined repeatedly when the BitString is traversed (to distinguish processing of the BFR from processing of the BFER). Instead, the hop limit and TTL are determined in a unified manner before the BitString is traversed. The following describes this implementation in detail with reference to FIG. 10.

Figure 10:
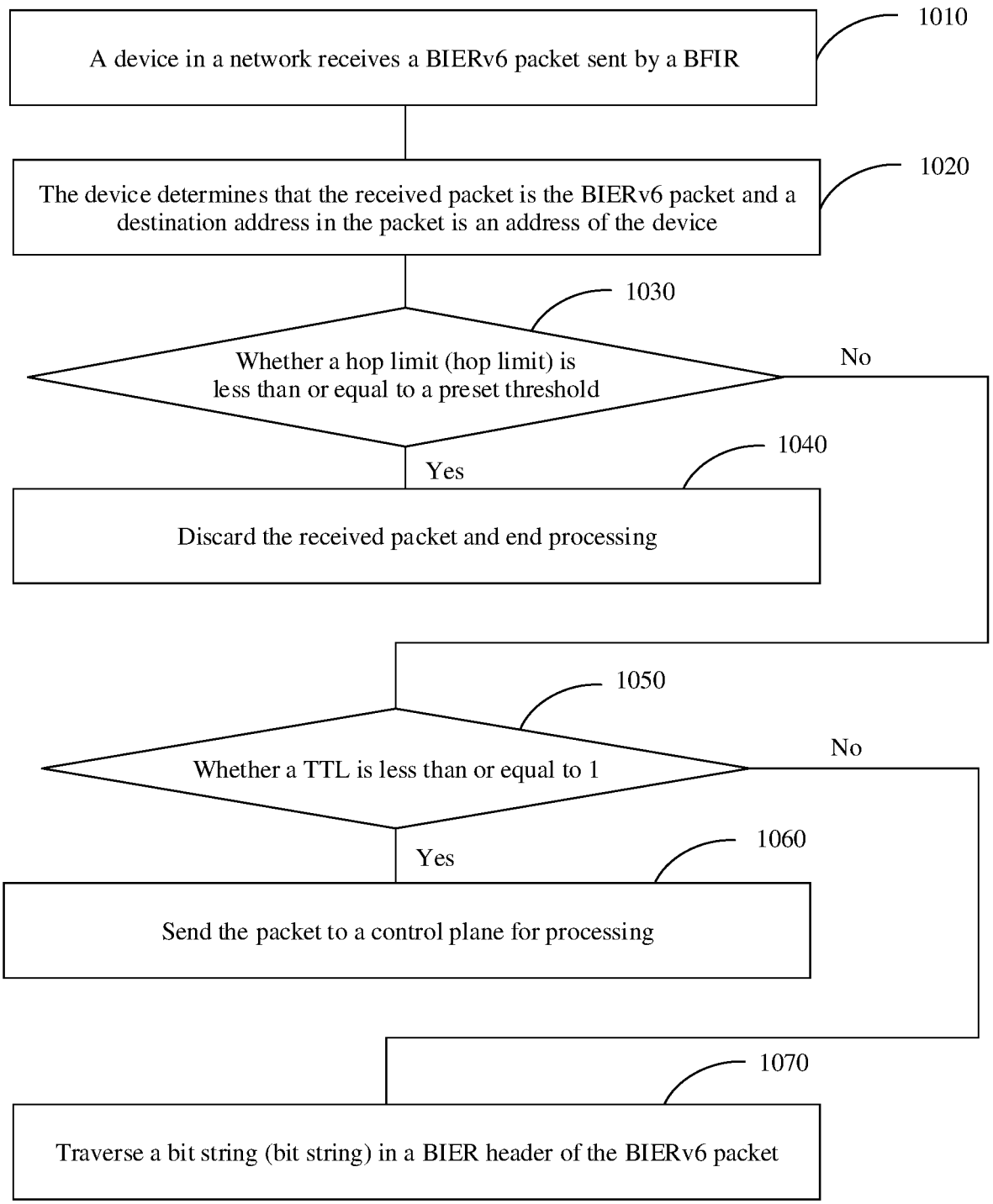
FIG. 10 is a schematic flowchart of still another BIERv6 packet forwarding method according to an embodiment.

FIG. 10 is a schematic flowchart of still another BIERv6 packet forwarding method according to an embodiment. As shown in FIG. 10, the method may include steps 1010 to 1070. The following separately describes the steps 1010 to 1070 in detail.

Step 1010: A device in a network receives a BIERv6 packet sent by a BFIR.

The step 1010 corresponds to the step 910. For details, refer to the descriptions in the step 910, and details are not described herein again.

Step 1020: The device determines that the received packet is the BIERv6 packet and a destination address in the packet is an address of the device.

The step 1020 corresponds to the step 920. For details, refer to the descriptions in the step 920, and details are not described herein again.

Step 1030: The device checks whether a hop limit in the outer IPv6 header is less than or equal to a preset threshold.

If the hop limit in the outer IPv6 header is less than or equal to the preset threshold, step 1040 may be performed.

If the hop limit in the outer IPv6 header is greater than the preset threshold, step 1050 may be performed.

Step 1040: The device discards the received packet and ends processing.

It should be understood that, in step 1040, before the device is determined as the BFR or the BFER, the received packet is discarded, and processing ends. In other words, in step 1040, the received packet is discarded in advance. In step 970, after it is determined that the device is the BFER, if the packet is not the BIER OAM packet and the hop limit in the outer IPv6 header is equal to the preset threshold, the received packet is discarded, and processing ends.

Step 1050: The device determines whether a value of a TTL field in the BIER header of the packet is less than or equal to 1.

If the value of the TTL field in the BIER header is less than or equal to 1, step 1060 is performed.

If the value of the TTL field in the BIER header is greater than 1, step 1070 is performed.

Step 1060: The device sends the packet to a control plane for processing.

The step 1060 corresponds to the step 960. For details, refer to the descriptions in the step 960, and details are not described herein again.

Step 1070: The device traverses a BitString in the BIER header of the BIERv6 packet.

In an example, if a bit of the BitString in the BIER header is valid (for example, a value of the bit is 1), and the bit represents the current node, a type of an inner data packet of the BIERv6 packet may further be determined. If the packet is not the BIER OAM packet, the outer IPv6 header and the IPv6 extension header are popped out, and subsequent forwarding is performed based on an inner multicast data packet. If the packet is the BIER OAM packet, the packet is subsequently processed by the control plane, and a processing mode of the packet may be processing performed according to a BIER OAM protocol. For example, whether the BIER OAM packet is an echo request packet is checked. If the BIER OAM packet is the echo request packet, an echo reply of the BIER OAM packet is correspondingly sent to a source address in the outer IPv6 header of the packet.

For another example, if a bit traversed in the BitString in the BIER header is valid (for example, a value of the bit is 1), and the bit represents another node other than the current node, information about a next hop to the another node may be obtained, for example, an outbound interface or a MAC address of the next hop. The BIERv6 packet is duplicated, 1 is subtracted from the value of the hop limit of the outer IPv6 header of the duplicated BIERv6 packet, 1 is subtracted from the TTL value of the BIER header, and the duplicated BIERv6 packet is sent to the next hop based on the obtained information about the next hop to the another node.

It should be noted that in step 1070, the values of the hop limit and the TTL do not need to be determined.

The following uses the scenario shown in FIG. 6 as an example to describe how the BIERv6 router (for example, the BFR or the BFER) in the network processes the packet according to the method shown in FIG. 10 by using an example in which the inner data packet of the BIERv6 packet is the IPv4/IPv6 packet. It should be understood that, in the following embodiment, it is assumed that the hop limit threshold of the BFR is 2, and the hop limit threshold of the BFER is 1.

In an example, when the BFR 3 receives a multicast data packet encapsulated in the BIERv6 packet, the value of the hop limit in the outer IPv6 header is 2, the TTL value in the BIER header is 1, and the BitString includes the BFER 7 node. A processing result is that the BFR 3 discards the packet.

In another example, when the BFR 3 receives a multicast data packet encapsulated in the BIERv6, the value of the hop limit is 3, the TTL value is 1, and the BitString includes the BFER 7 node. A processing result is that the BFR 3 forwards the BIERv6 packet to the R5. The destination address in the outer IPv6 header of the BIERv6 packet is an IP address of the BFER 7, the hop limit in the outer IPv6 header is 2, and the TTL in the BIER header is 0. After receiving the BIERv6 packet, the R5 forwards the packet to the BFER 7. The destination address of the BIERv6 packet is the IP address of the BFER 7, the hop limit is 1, and the TTL is 0. After receiving the BIERv6 packet, the BFER 7 discards the packet according to the foregoing packet forwarding method and ends processing.

In another example, when the BFR 3 receives a multicast data packet encapsulated in the BIERv6, the value of the hop limit is 3, the TTL value is 2, and the BitString includes the BFER 7 node. A processing result is that the BFR 3 forwards the BIERv6 packet to the R5. The destination address of the BIERv6 packet is an IP address of the BFER 7, the hop limit is 2, and the TTL is 1. After receiving the packet, the R5 forwards the packet to the BFER 7. The destination address of the BIERv6 packet is the IP address of the BFER 7, the hop limit is 1, and the TTL is 1. After receiving the BIERv6 packet, the BFER 7 discards the packet and ends processing.

In another example, when the BFR 3 receives a multicast data packet encapsulated in the BIERv6, the value of the hop limit is 3, the TTL value is 3, and the BitString includes the BFER 7 node. A processing result is that the BFR 3 forwards the BIERv6 packet to the R5. The destination address of the BIERv6 packet is an IP address of the BFER 7, the hop limit is 2, and the TTL is 2. After receiving the packet, the R5 forwards the packet to the BFER 7. The destination address of the BIERv6 packet is the IP address of the BFER 7, the hop limit is 1, and the TTL is 2. After receiving the BIERv6 packet, the BFER 7 discards the packet and ends processing.

In another example, when the BFR 3 receives a multicast data packet encapsulated in the BIERv6, the value of the hop limit is 4, the TTL value is 3, and the BitString includes the BFER 7 node. A processing result is that the BFR 3 forwards the BIERv6 packet to the R5. The destination address of the BIERv6 packet is an IP address of the BFER 7, the hop limit is 3, and the TTL is 2. After receiving the packet, the R5 forwards the packet to the BFER 7. The destination address of the BIERv6 packet is the IP address of the BFER 7, the hop limit is 2, and the TTL is 2. After receiving the BIERv6 packet, the BFER 7 decapsulates the BIERv6 header according to the foregoing packet forwarding method and forwards the BIERv6 packet based on the inner multicast data packet.

The following uses the scenario shown in FIG. 6 as an example to describe how the BIERv6 router (for example, the BFR or the BFER) in the network processes the packet according to the method shown in FIG. 10 by using an example in which the inner data packet of the BIERv6 packet is the BIER OAM packet. It should be understood that, in the following embodiment, it is assumed that the hop limit threshold of the BFR is 2, and the hop limit threshold of the BFER is 1.

In a possible implementation, a BIER trace detection is used as an example. It is assumed that BIER packets whose TTL=1/2/3 are sequentially sent from the BFIR, and each packet uses hop limit=127. A processing process is as follows.

In an example, for the first OAM packet, the packet sent by the BFIR carries TTL=1 and hop limit=127. After receiving the packet, the BFR 1 sends the packet to the control plane, and the control plane sends an echo reply OAM packet.

In another example, for the second OAM packet, the packet sent by the BFIR carries TTL=2 and hop limit=127. After receiving the packet, the BFR 1 forwards the packet to the BFR 3. The TTL of the packet received by the BFR 3 is 1, and the hop limit of the packet received by the BFR 3 is 126. After receiving the packet, the BFR 3 sends the packet to the control plane, and the control plane sends an echo reply OAM packet.

In another example, for the third OAM packet, the packet sent by the BFIR carries TTL=3 and hop limit=127. After receiving the packet, the BFR 1 forwards the packet to the BFR 3. The TTL of the packet received by BFR 3 is 2, and the hop limit of the packet received by BFR 3 is 126. After receiving the packet, the BFR 3 sends the packet to the R5. The TTL of the packet received by the R5 is 1, and the hop limit of the packet received by the R5 is 125. After receiving the packet, the R5 sends the packet to the BFER 7, where the TTL of the packet received by the BFER 7 is 1, and the hop limit of the packet received by the BFER 7 is 124. The BFER 7 sends the packet to the control plane, and the control plane sends an echo reply OAM packet.

In another possible implementation, a BIER trace detection is used as an example. It is assumed that BIER packets whose TTL=1/2/3 are sequentially sent from the BFIR, and each packet uses hop limit=3. A processing process is as follows.

In an example, for the first OAM packet, the packet sent by the BFIR carries TTL=1 and hop limit=3. After receiving the packet, the BFR 1 sends the packet to the control plane, and the control plane sends an echo reply OAM packet.

In another example, for the second OAM packet, the packet sent by the BFIR carries TTL=2 and hop limit=3. After receiving the packet, the BFR 1 forwards the packet to the BFR 3. The TTL of the packet received by the BFR 3 is 1, and the hop limit of the packet received by the BFR 3 is 2. After receiving the packet, the BFR 3 discards the packet and does not send an echo reply packet.

In another example, for the third OAM packet, the packet sent by the BFIR carries TTL=3 and hop limit=3. After the BFR 1 receives the packet, the BFR 1 forwards the packet to the BFR 3. The TTL of the packet received by the BFR 3 is 2, and the hop limit of the packet received by the BFR 3 is 2. After receiving the packet, the BFR 3 discards the packet and does not send an echo reply packet.

The foregoing describes in detail the BIER packet forwarding method provided in the embodiments with reference to FIG. 1 to FIG. 10. The following describes in detail apparatus embodiments with reference to FIG. 11 to FIG. 13. It should be understood that the descriptions of the method embodiments correspond to descriptions of the apparatus embodiments. Therefore, for parts that are not described in detail, refer to the foregoing method embodiments.

Figure 11:
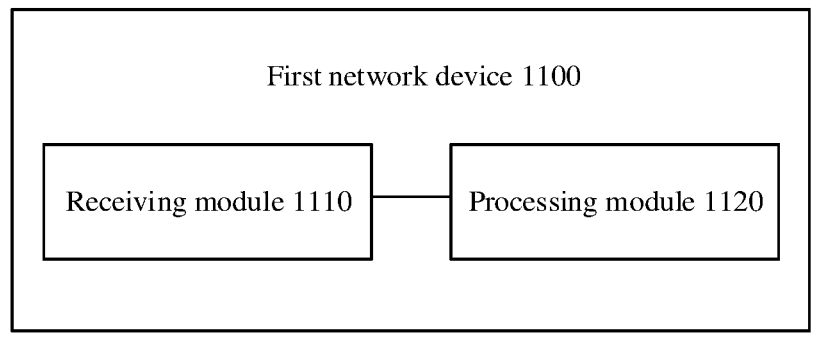
FIG. 11 is a schematic structural diagram of a first network device according to an embodiment.

FIG. 11 is a schematic structural diagram of a first network device 1100 according to an embodiment. The first network device 1100 shown in FIG. 11 is a bit forwarding router BFR or a bit forwarding egress router BFER and may perform the corresponding steps performed by the first network device in the method in the foregoing embodiments. As shown in FIG. 11, the first network device 1100 includes a receiving module 1110 and a processing module 1120.

The receiving module 1110 is configured to receive a bit index explicit replication internet protocol version 6 BIERv6 packet, where the BIERv6 packet includes a hop limit field.

The processing module 1120 is configured to determine whether a value of the hop limit field in the BIERv6 packet is less than or equal to a preset threshold of the first network device, where the preset threshold is a value greater than or equal to 2, the preset threshold is determined based on a quantity of one or more consecutive second network devices connected to the first network device, and the second network device is a device that does not support BIER forwarding.

The processing module 1120 is further configured to avoid forwarding the BIERv6 packet when the value of the hop limit field in the BIERv6 packet is less than or equal to the preset threshold.

Optionally, the processing module 1120 is further configured to discard the BIERv6 packet.

Optionally, the processing module 1120 is further configured to avoid forwarding the BIERv6 packet when the value of the hop limit field in the BIERv6 packet is equal to the preset threshold.

Optionally, the processing module 1120 is further configured to: if the first network device is the BFR, avoid forwarding the BIERv6 packet when the value of the hop limit field in the BIERv6 packet is equal to the preset threshold; or if the first network device is the BFER, decapsulate the BIERv6 packet and forward a decapsulated inner packet when the value of the hop limit field in the BIERv6 packet is equal to the preset threshold.

Optionally, the BIERv6 packet includes a bit string BitString, and the processing module 1120 is further configured to: when one bit in the BitString is valid and the bit represents the first network device, determine that the first network device is the BFER; or when one bit in the BitString is valid and the bit represents a device other than the first network device, determine that the first network device is the BFR.

Optionally, the processing module 1120 is further configured to: if the first network device is the BFR, send the BIERv6 packet to a next-hop device of the first network device when the value of the hop limit field in the BIERv6 packet is greater than the preset threshold; or if the first network device is the BFER, decapsulate the BIERv6 packet and forward the decapsulated inner packet when the value of the hop limit field in the BIERv6 packet is greater than the preset threshold.

Optionally, the first network device is a BFR or a BFER in a BIER domain.

Figure 12:
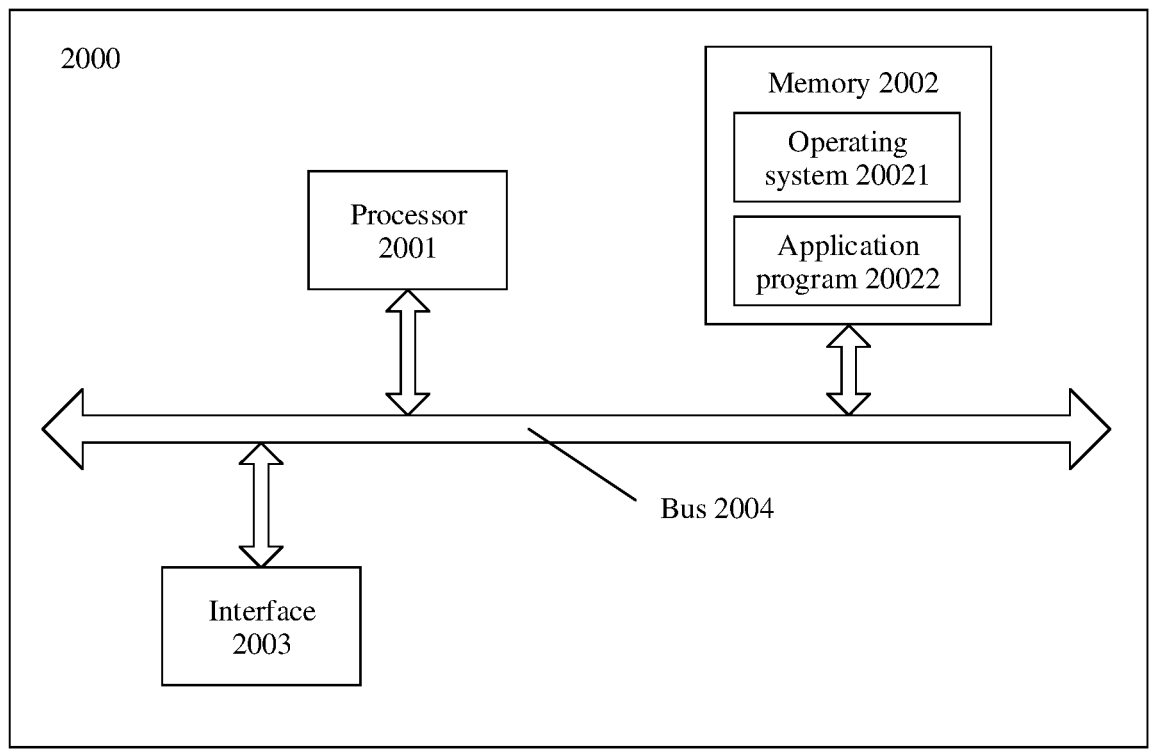
FIG. 12 is a schematic diagram of a hardware structure of a first network device according to an embodiment.

FIG. 12 is a schematic diagram of a hardware structure of a first network device 2000 according to an embodiment. The first network device 2000 shown in FIG. 12 may perform the corresponding steps performed by the first network device in the method in the foregoing embodiments.

As shown in FIG. 12, the first network device 2000 includes a processor 2001, a memory 2002, an interface 2003, and a bus 2004. The interface 2003 may be implemented in a wireless or wired manner and may be a network adapter. The processor 2001, the memory 2002, and the interface 2003 are connected through the bus 2004.

The interface 2003 may include a transmitter and a receiver and is configured for the first network device to implement the foregoing receiving and sending. For example, the interface 2003 is configured to receive a bit index explicit replication internet protocol version 6 BIERv6 packet.

The processor 2001 is configured to perform processing performed by the first network device in the foregoing embodiments, for example, configured to determine whether a value of a hop limit field in the BIERv6 packet is less than or equal to a preset threshold of the first network device; further configured to avoid forwarding the BIERv6 packet when the value of the hop limit field in the BIERv6 packet is less than or equal to the preset threshold; and/or configured to perform another process used for the technology described. The memory 2002 includes an operating system 20021 and an application program 20022, and is configured to store a program, code, or an instruction. When executing the program, the code, or the instruction, the processor or a hardware device may complete a processing process of the first network device in the method embodiments. Optionally, the memory 2002 may include a ROM and a RAM. The ROM includes a basic input/output system (BIOS) or an embedded system, and the RAM includes an application program and an operating system. When the first network device 2000 needs to be run, a bootloader in the BIOS or the embedded system that is built into the ROM is used to boot a system to start, and boot the first network device 2000 to enter a normal running state. After entering the normal running state, the first network device 2000 runs the application program and the operating system in the RAM, to complete the processing process of the first network device 2000 in the method embodiments.

It may be understood that FIG. 12 shows only a simplified design of the first network device 2000. In actual application, the first network device may include any quantity of interfaces, processors, or memories.

Figure 13:
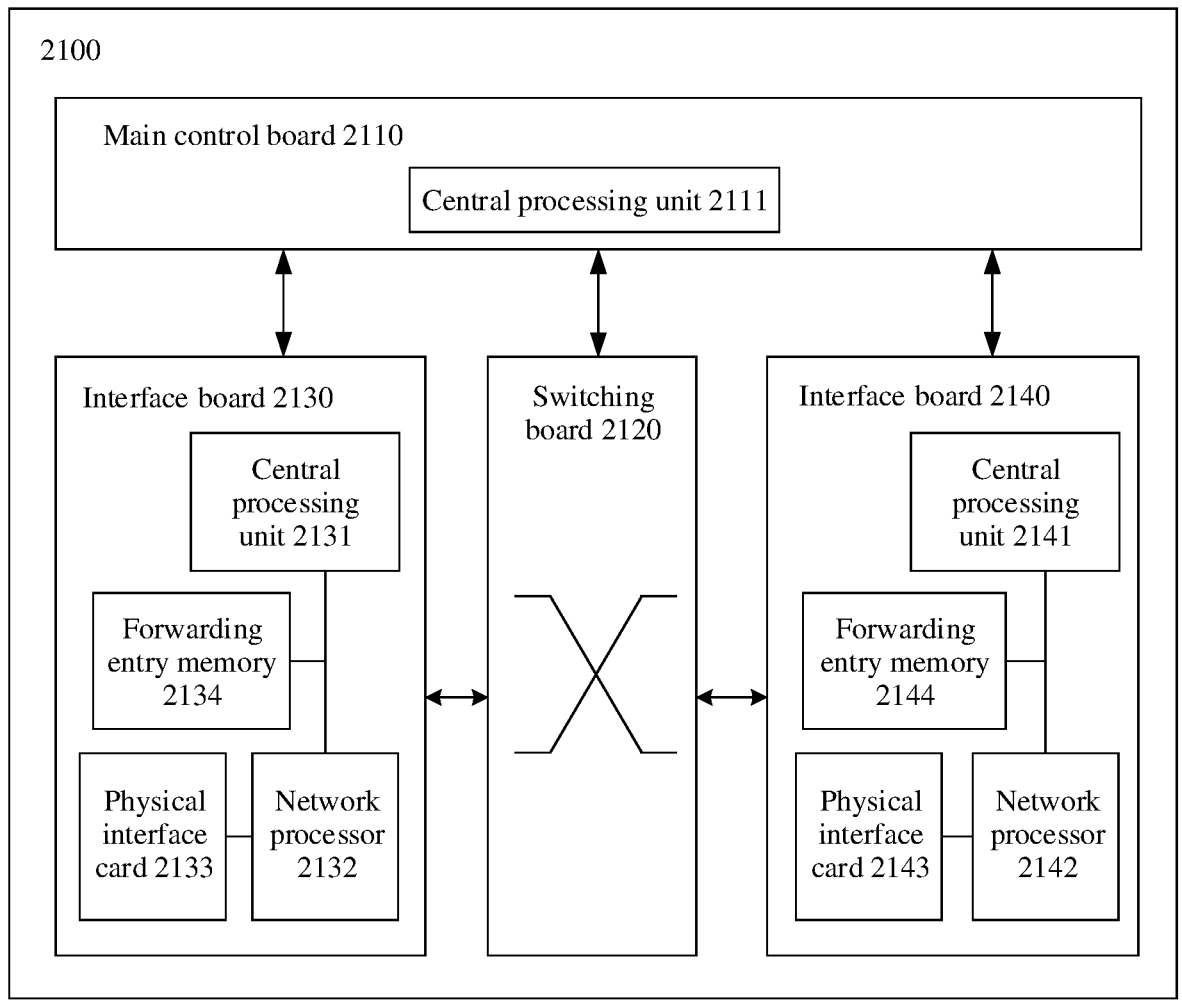
FIG. 13 is a schematic diagram of a hardware structure of another first network device according to an embodiment.

FIG. 13 is a schematic diagram of a hardware structure of another first network device 2100 according to an embodiment. The first network device 2100 shown in FIG. 13 may perform the corresponding steps performed by the first network device in the method in the foregoing embodiments.

As shown in FIG. 13, the first network device 2100 includes a main control board 2110, an interface board 2130, a switching board 2120, and an interface board 2140. The main control board 2110, the interface boards 2130 and 2140, and the switching board 2120 are connected to a system backplane through a system bus to implement interworking. The main control board 2110 is configured to complete functions such as system management, device maintenance, and protocol processing. The switching board 2120 is configured to exchange data between interface boards (the interface board is also referred to as a line card or a service board). The interface boards 2130 and 2140 each are configured to provide various service interfaces (for example, a POS interface, a GE interface, and an ATM interface), and forward a data packet.

The interface board 2130 may include a central processing unit 2131, a forwarding entry memory 2134, a physical interface card 2133, and a network processor 2132. The central processing unit 2131 is configured to control and manage the interface board and communicate with a central processing unit on the main control board. The forwarding entry memory 2134 is configured to store an entry, for example, the foregoing BIFT. The physical interface card 2133 is configured to receive and send traffic.

It should be understood that an operation on the interface board 2140 is consistent with an operation on the interface board 2130 in this embodiment. For brevity, details are not described.

It should be understood that the first network device 2100 in this embodiment may correspond to the functions and/or the various implemented steps in the foregoing method embodiments. Details are not described herein.

In addition, it should be noted that there may be one or more main control boards. When there are a plurality of main control boards, a primary main control board and a secondary main control board may be included. There may be one or more interface boards. The first network device having a stronger data processing capability provides more interface boards. There may also be one or more physical interface cards on the interface board. There may be no switching board or there may be one or more switching boards. When there are a plurality of switching boards, load sharing and redundancy backup may be implemented together. In a centralized forwarding architecture, the first network device may need no switching board. The interface board provides a function of processing service data of the entire system. In a distributed forwarding architecture, the first network device may have at least one switching board. Data between a plurality of interface boards is exchanged through the switching board, to provide a large-capacity data exchange and processing capability. Therefore, a data access and processing capability of the first network device in the distributed architecture is better than that of the device in the centralized architecture. A specific architecture to be used depends on a specific networking deployment scenario. This is not limited herein.

An embodiment further provides a computer-readable storage medium. The computer-readable storage medium stores computer program code, and when the computer program code is run on a computer, the computer is enabled to perform the method performed by the first network device. The computer-readable storage medium includes but is not limited to one or more of the following: a ROM, a PROM, an EPROM, a flash memory, an (EEPROM, and a hard drive.

An embodiment further provides a chip system. The chip system is used in a first network device, and the chip system includes at least one processor, at least one memory, and an interface circuit. The interface circuit is responsible for information exchange between the chip system and an external environment. The at least one memory, the interface circuit, and the at least one processor are connected to each other through a line. The at least one memory stores an instruction. The instruction is executed by the at least one processor, to perform operations performed by the first network device in the methods according to the foregoing aspects.

In an implementation process, the chip may be implemented in a form of a CPU), an MCU, an MPU, a DSP), a SoC, an ASIC, an FPGA), or a PLD.

An embodiment further provides a computer program product. The computer program product is applied to a first network device, and the computer program product includes a series of instructions. When the instructions are executed, operations performed by the first network device in the methods according to the foregoing aspects are performed.

It should be understood that sequence numbers of the foregoing processes do not mean execution sequences in various embodiments. The execution sequences of the processes should be determined according to functions and internal logic of the processes and should not be construed as any limitation on the implementation processes of the embodiments.

A person of ordinary skill in the art may be aware that, in combination with the examples described in the embodiments, units and algorithm steps may be implemented by electronic hardware or a combination of computer software and electronic hardware. Whether the functions are performed by hardware or software depends on particular applications and design constraints of the solutions. A person of ordinary skill in the art may use different methods to implement the described functions for each particular application, but it should not be considered that the implementation goes beyond the scope of the embodiments.

It may be clearly understood by a person of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the disclosed system, apparatus, and method may be implemented in other manners. For example, the described apparatus embodiment is merely an example. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the solutions essentially, or some of the solutions may be implemented in a form of a software product. The computer software product is stored in a storage medium and includes several instructions for instructing a computer device (which may be a personal computer, a server, or a network device) to perform all or some of the steps of the methods described in the embodiments. The foregoing storage medium includes any medium that can store program code, for example, a USB flash drive, a removable hard disk, a ROM, a RAM, a magnetic disk, or an optical disc.

The foregoing descriptions are merely implementations, but are non-limiting.

What is claimed is:

1. A bit index explicit replication internet protocol version 6 (BIERv6) packet forwarding method, comprising:
   receiving, by a first network device, a BIERv6 packet, wherein the BIERv6 packet comprises a hop limit field, and the first network device is a bit forwarding router (BFR) or a bit forwarding egress router (BFER);
   determining, by the first network device, whether a value of the hop limit field in the BIERv6 packet is less than or equal to a preset threshold of the first network device, wherein the preset threshold is a value greater than or equal to 2, the preset threshold is determined based on one plus a quantity of one or more consecutive second network devices connected to the first network device that do not support BIER forwarding; and
   when the value of the hop limit field in the BIERv6 packet is less than or equal to the preset threshold, the first network device skips forwarding the BIERv6 packet.

2. The method according to claim 1, further comprising: discarding, by the first network device, the BIERv6 packet.

3. The method according to claim 1, further comprising: if the first network device is the BFER, discarding, by the first network device, the BIERv6 packet when the value of the hop limit field in the BIERv6 packet is equal to the preset threshold, and an inner packet of the BIERv6 packet is not a bit index explicit replication operation, administration and maintenance (BIER OAM) packet.

4. The method according to claim 1, further comprising: if the first network device is the BFR, avoiding, by the first network device, forwarding the BIERv6 packet when the value of the hop limit field in the BIERv6 packet is equal to the preset threshold; or
   if the first network device is the BFER, avoiding, by the first network device, forwarding the BIERv6 packet when the value of the hop limit field in the BIERv6 packet is equal to the preset threshold.

5. The method according to claim 4, wherein the BIERv6 packet comprises a bit string BitString, and the method further comprises:
   when the first network device determines that one bit in the BitString is valid and the bit represents the first network device, determining, by the first network device, that the first network device is the BFER; or
   when the first network device determines that one bit in the BitString is valid and the bit represents a device other than the first network device, determining, by the first network device, that the first network device is the BFR.

6. The method according to claim 3, further comprising:
   if the first network device is the BFR, sending, by the first network device, the BIERv6 packet to a next-hop device of the first network device when the value of the hop limit field in the BIERv6 packet is greater than the preset threshold; or
   if the first network device is the BFER, decapsulating, by the first network device, the BIERv6 packet and forwarding the decapsulated inner packet when the value of the hop limit field in the BIERv6 packet is greater than the preset threshold.

7. The method according to claim 1, wherein the first network device is a BFR or a BFER in a BIER domain.

8. A first network device, wherein the first network device is a bit forwarding router (BFR) or a bit forwarding egress router (BFER), and the first network device comprises:
   a non-transitory memory storing instructions; and
   a processor coupled to the non-transitory memory; wherein the instructions, when executed by the processor, cause the first network device to be configured to:
   receive a bit index explicit replication internet protocol version 6 (BIERv6) packet, wherein the BIERv6 packet comprises a hop limit field; and
   determine whether a value of the hop limit field in the BIERv6 packet is less than or equal to a preset threshold of the first network device, wherein the preset threshold is a value greater than or equal to 2, the preset threshold is determined based on one plus a quantity of one or more consecutive second network devices connected to the first network device that do not support BIER forwarding; wherein
   when the value of the hop limit field in the BIERv6 packet is less than or equal to the preset threshold, the first network device skips forwarding the BIERv6 packet.

9. The first network device according to claim 8, wherein the instructions, when executed by the processor, further cause the first network device to be configured to:
   discard the BIERv6 packet.

10. The first network device according to claim 8, wherein the instructions, when executed by the processor, further cause the first network device to be configured to:
    if the first network device is the BFER, discard the BIERv6 packet when the value of the hop limit field in the BIERv6 packet is equal to the preset threshold, and an inner packet of the BIERv6 packet is not a bit index explicit replication operation, administration and maintenance (BIER OAM) packet.

11. The first network device according to claim 8, wherein the instructions, when executed by the processor, further cause the first network device to be configured to:
    if the first network device is the BFR, avoid forwarding the BIERv6 packet when the value of the hop limit field in the BIERv6 packet is equal to the preset threshold; or
    if the first network device is the BFER, avoid forwarding the BIERv6 packet when the value of the hop limit field in the BIERv6 packet is equal to the preset threshold.

12. The first network device according to claim 11, wherein the BIERv6 packet comprises a BitString, and the instructions, when executed by the processor, further cause the first network device to be configured to:

when one bit in the BitString is valid and the bit represents the first network device, determine that the first network device is the BFER; or when one bit in the BitString is valid and the bit represents a device other than the first network device, determine that the first network device is the BFR.

13. The first network device according to claim 10, wherein the instructions, when executed by the processor, further cause the first network device to be configured to:
if the first network device is the BFR, send the BIERv6 packet to a next-hop device of the first network device when the value of the hop limit field in the BIERv6 packet is greater than the preset threshold; or
if the first network device is the BFER, decapsulate the BIERv6 packet and forward the decapsulated inner packet when the value of the hop limit field in the BIERv6 packet is greater than the preset threshold.

14. The first network device according to claim 8, wherein the first network device is a BFR or a BFER in a BIER domain.

15. A non-transitory computer storage medium, wherein the non-transitory computer storage medium stores a computer-executable instruction, and when the computer-executable instruction is invoked by a first network device, the first network device is enabled to perform:
receiving a bit index explicit replication internet protocol version 6 BIERv6 packet, wherein the BIERv6 packet comprises a hop limit field, and the first network device is a bit forwarding router (BFR) or a bit forwarding egress router (BFER);
determining whether a value of the hop limit field in the BIERv6 packet is less than or equal to a preset threshold of the first network device, wherein the preset threshold is a value greater than or equal to 2, the preset threshold is determined based on one plus a quantity of one or more consecutive second network devices connected to the first network device that do not support BIER forwarding; and
when the value of the hop limit field in the BIERv6 packet is less than or equal to the preset threshold, the first network device skips forwarding the BIERv6 packet.

16. The non-transitory computer storage medium according to claim 15, wherein when the computer-executable instruction is invoked by a first network device, the first network device is further enabled to perform:
discarding the BIERv6 packet.

17. The non-transitory computer storage medium according to claim 15, wherein when the computer-executable instruction is invoked by a first network device, the first network device is further enabled to perform:
if the first network device is the BFER, discarding the BIERv6 packet when the value of the hop limit field in the BIERv6 packet is equal to the preset threshold, and an inner packet of the BIERv6 packet is not a bit index explicit replication operation, administration and maintenance (BIER OAM) packet.

18. The non-transitory computer storage medium according to claim 15, wherein when the computer-executable instruction is invoked by a first network device, the first network device is further enabled to perform:
if the first network device is the BFR, avoiding forwarding the BIERv6 packet when the value of the hop limit field in the BIERv6 packet is equal to the preset threshold; or
if the first network device is the BFER, avoiding forwarding the BIERv6 packet when the value of the hop limit field in the BIERv6 packet is equal to the preset threshold.

19. The non-transitory computer storage medium according to claim 18, wherein the BIERv6 packet comprises a BitString, and when the computer-executable instruction is invoked by a first network device, the first network device is further enabled to perform:
when the first network device determines that one bit in the BitString is valid and the bit represents the first network device, determining that the first network device is the BFER; or
when the first network device determines that one bit in the BitString is valid and the bit represents a device other than the first network device, determining that the first network device is the BFR.

20. The non-transitory computer storage medium according to claim 17, wherein when the computer-executable instruction is invoked by a first network device, the first network device is further enabled to perform:
if the first network device is the BFR, sending the BIERv6 packet to a next-hop device of the first network device when the value of the hop limit field in the BIERv6 packet is greater than the preset threshold; or
if the first network device is the BFER, decapsulating the BIERv6 packet and forwarding the decapsulated inner packet when the value of the hop limit field in the BIERv6 packet is greater than the preset threshold.

* * * * *